United States Patent
Lause

(10) Patent No.: US 11,543,227 B2
(45) Date of Patent: Jan. 3, 2023

(54) MACHINE TOOL INSPECTION

(71) Applicant: Shawn Thomas Lause, Leslie, MO (US)

(72) Inventor: Shawn Thomas Lause, Leslie, MO (US)

(*) Notice: Subject to any disclaimer, the term of this patent is extended or adjusted under 35 U.S.C. 154(b) by 3 days.

(21) Appl. No.: 17/353,354

(22) Filed: Jun. 21, 2021

(65) Prior Publication Data

US 2021/0381816 A1    Dec. 9, 2021

Related U.S. Application Data

(63) Continuation-in-part of application No. 16/419,772, filed on May 22, 2019, now Pat. No. 11,040,425, which is a continuation of application No. 16/252,248, filed on Jan. 18, 2019, now Pat. No. 10,935,359, which is a continuation-in-part of application No. 15/133,411, filed on Apr. 20, 2016, now Pat. No. 10,184,775.

(60) Provisional application No. 62/674,712, filed on May 22, 2018, provisional application No. 62/558,134, filed on Sep. 13, 2017.

(51) Int. Cl.
   *G01B 5/08*        (2006.01)

(52) U.S. Cl.
   CPC ..................... *G01B 5/08* (2013.01)

(58) Field of Classification Search
   CPC ..................................................... B23Q 17/22
   USPC ........................................................... 33/626
   See application file for complete search history.

(56) References Cited

U.S. PATENT DOCUMENTS

| | | | | |
|---|---|---|---|---|
| 5,097,604 | A * | 3/1992 | Brown | G01B 5/20 33/832 |
| 6,964,102 | B2 * | 11/2005 | Schroder | G01D 5/2451 33/502 |
| 10,184,775 | B2 * | 1/2019 | Lause | B23Q 17/2466 |
| 10,335,914 | B2 * | 7/2019 | Röders | G05B 19/402 |
| 10,502,712 | B2 * | 12/2019 | Hall | G01B 17/02 |
| 10,935,359 | B2 * | 3/2021 | Lause | G01B 5/08 |
| 11,040,425 | B2 * | 6/2021 | Lause | B23Q 17/2233 |
| 11,293,742 | B2 * | 4/2022 | Anderson | G01B 5/14 |
| 2019/0078868 | A1 * | 3/2019 | Grossmann | G01B 5/252 |
| 2019/0078879 | A1 * | 3/2019 | Lause | G01B 21/042 |
| 2021/0379709 | A1 * | 12/2021 | Sano | B23B 35/00 |

* cited by examiner

*Primary Examiner* — George B Bennett

(57) ABSTRACT

A method of measuring the value of a machine tool's performance based upon tangible results. The method specifies the core principles of defining a machine tool part setup consisting of a plane, orientation, and origin. By establishing the plane, orientation, and origin measuring programs and cutting toolpaths are recorded with precision. Machine tool results of positioning, squareness, parallelism, and circularity are revealed upon establishing the proper machine tool setup. Using the method displays the quality of a machine tool which defines its value in the marketplace.

14 Claims, 25 Drawing Sheets

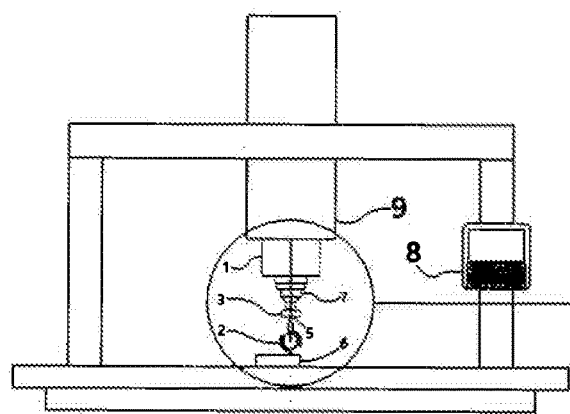
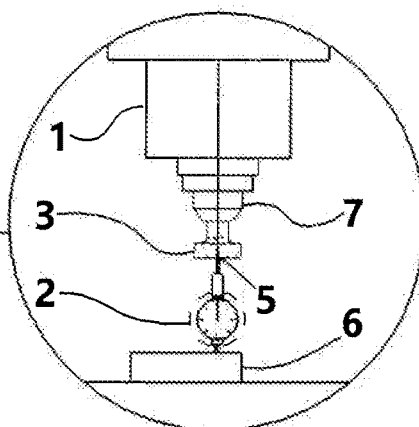
FIG. 3
FIG. 3a
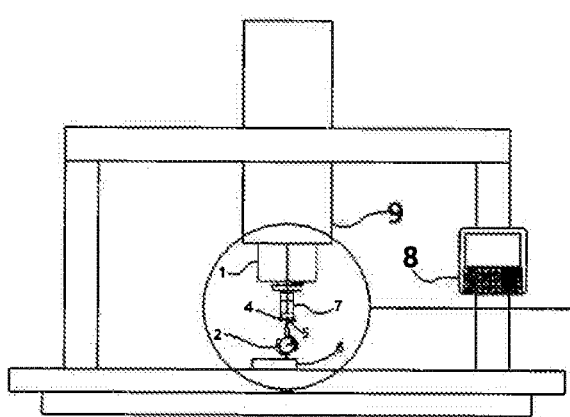
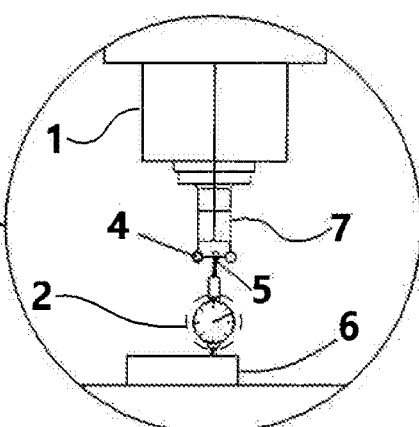
FIG. 4
FIG. 4a

FIG. 11

| Nominal Tool Size | Decimal Equivalent | Indicator Reading | Actual Tool Size |
|---|---|---|---|
| 1/2 inch | .5000 | -.0007 | .4986 |
| 13 mm | .5118 | -.0005 | .5108 |
| 15.7 mm | .6181 | -.0013 | .6155 |
| 17.7 mm | .6968 | +.0001 | .6970 |
| 3/4 inch | .7500 | -.0002 | .7496 |
| 20 mm | .7874 | -.0013 | .7848 |
| 25 mm | .9843 | -.0014 | .9815 |
| 1 inch | 1.0000 | -.0006 | .9988 |
| 28 mm | 1.1024 | -.0055 | 1.0914 |
| 1-1/4 inch | 1.2500 | +.0014 | 1.2528 |
| 1-1/2 inch | 1.5000 | -.0190 | 1.4620 |
| 42 mm | 1.6535 | +.0011 | 1.6557 |
| 1-7/8 inch | 1.8750 | +.0115 | 1.8980 |
| 2 inch | 2.0000 | -.0004 | 1.9992 |
| 52 mm | 2.0472 | -.0006 | 2.0460 |
| 2-3/8 inch | 2.3750 | -.0002 | 2.3746 |
| 3 inch | 3.0000 | -.0019 | 2.9962 |
| 80 mm | 3.1496 | +.0032 | 3.1560 |
| 90 mm | 3.5433 | +.0038 | 3.5509 |
| 6 inch | 6.0000 | -.0020 | 5.9960 |

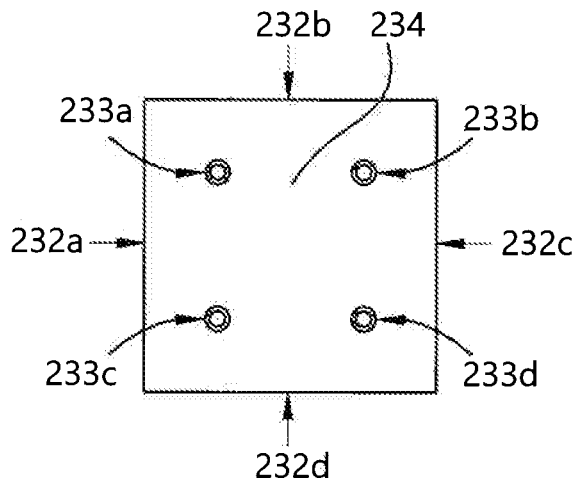
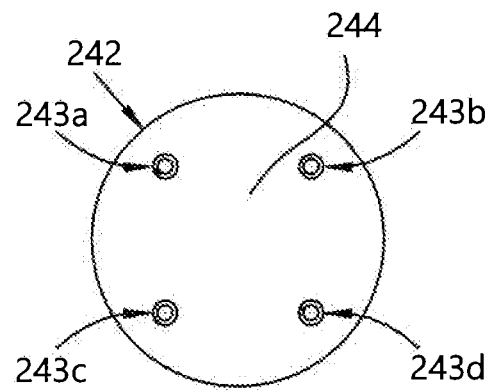
FIG. 15A  FIG. 15B
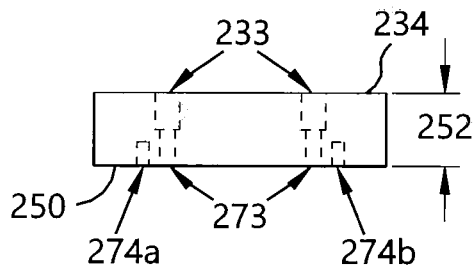
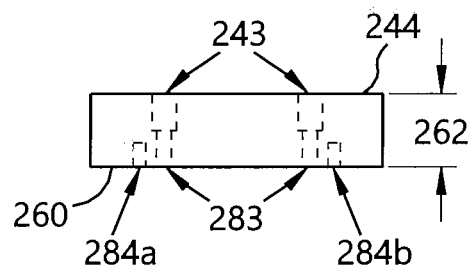
FIG. 16A  FIG. 16B
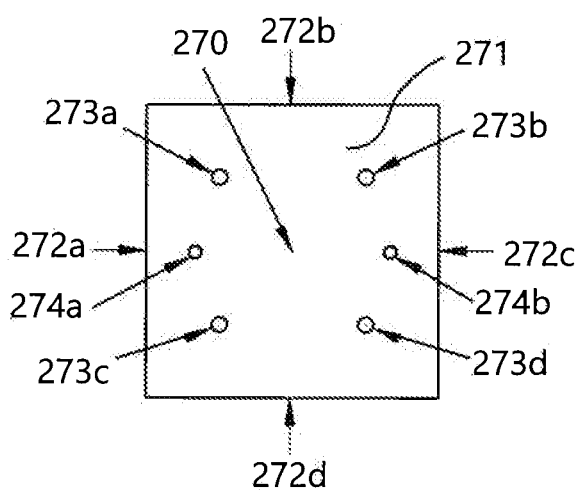
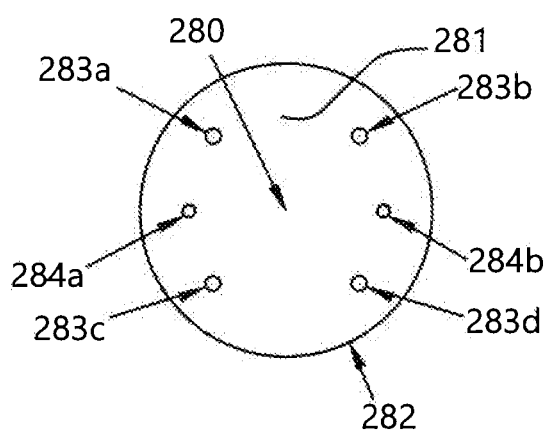
FIG. 17A  FIG. 17B

| | TARGET DIMENSION | ACTUAL |
|---|---|---|
| R20 | 6.0000 | 5.9998 |
| R21 | 6.0000 | 5.9998 |
| R22 | 6.0000 | 6.0001 |
| R23 | 6.0000 | 6.0001 |

| | TARGET DIMENSION | ACTUAL |
|---|---|---|
| R24 | 6.0000 | 5.9998 |
| R25 | 6.0000 | 6.0001 |
| R26 | 6.0000 | 6.0002 |
| R27 | 6.0000 | 6.0002 |
| R28 | 6.0000 | 5.9998 |
| R29 | 6.0000 | 5.9999 |
| R30 | 6.0000 | 6.0001 |
| R31 | 6.0000 | 6.0001 |

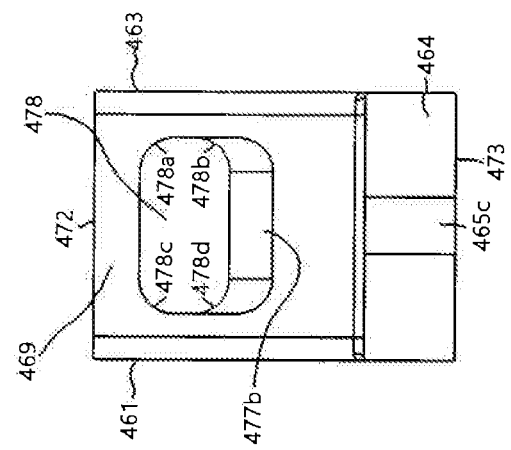
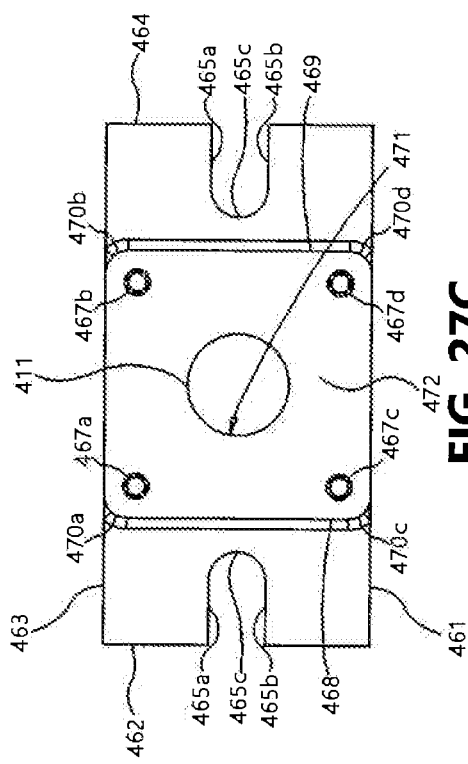
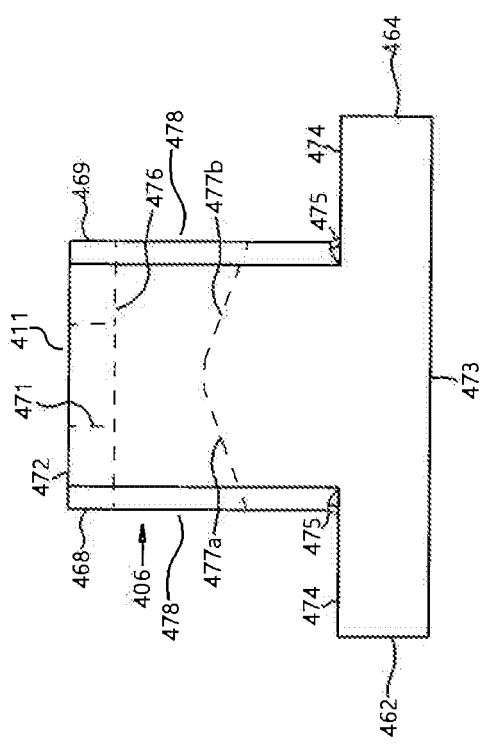
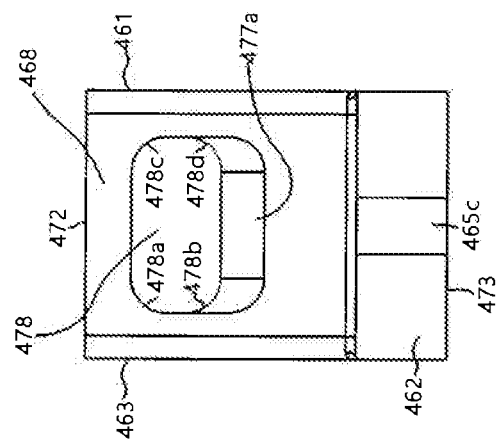

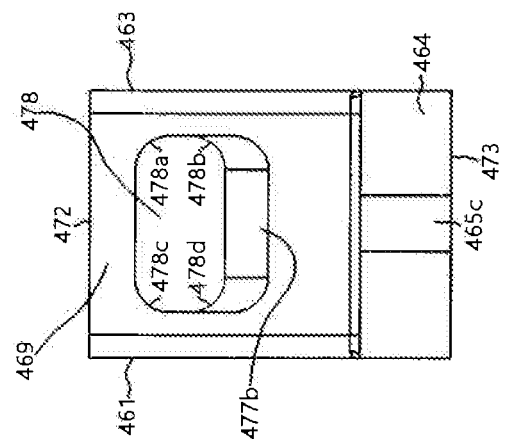
FIG. 27J
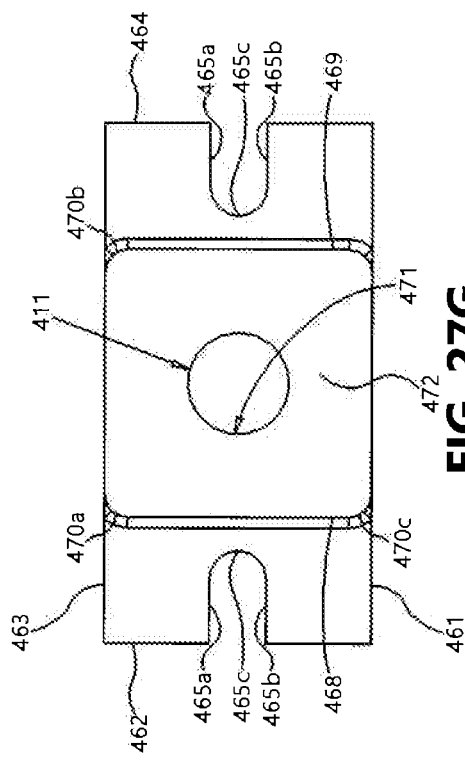
FIG. 27G
FIG. 27I
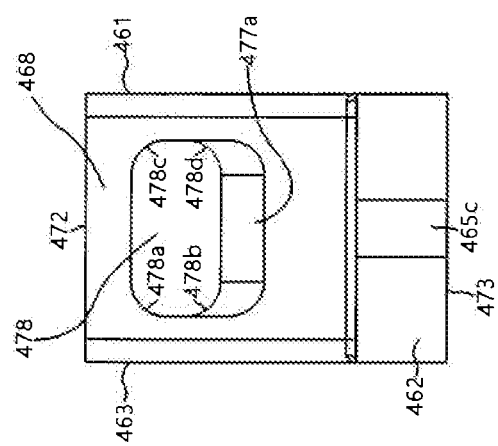
FIG. 27H

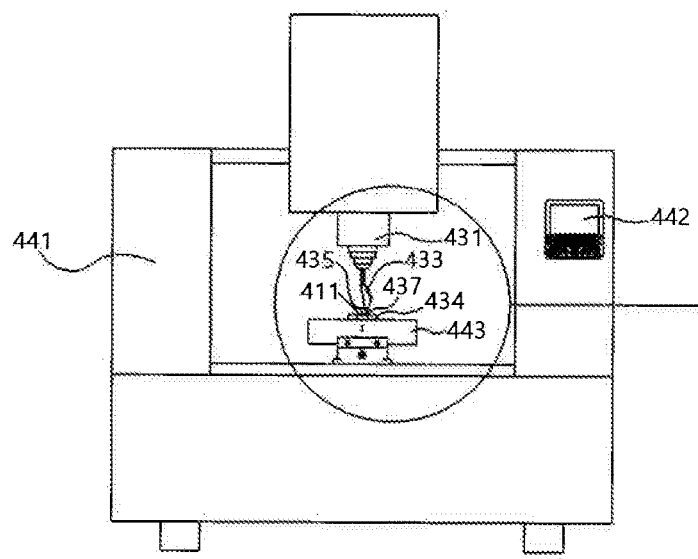 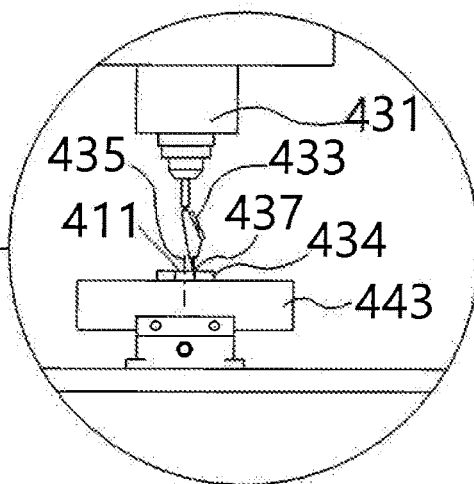
FIG. 30  FIG. 30a
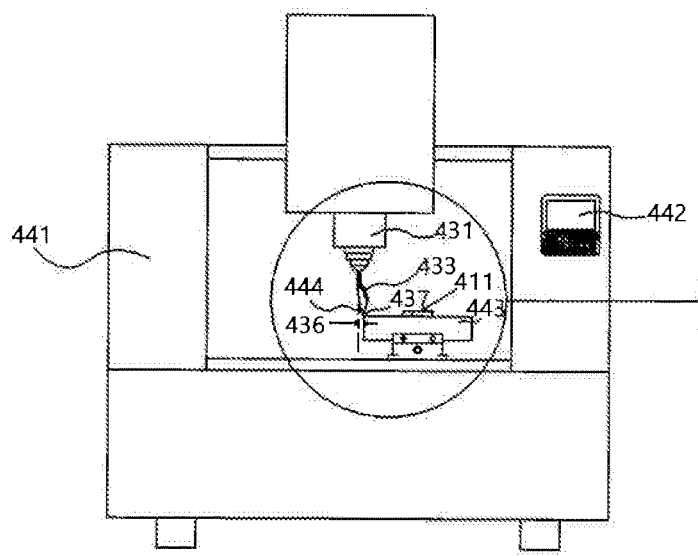 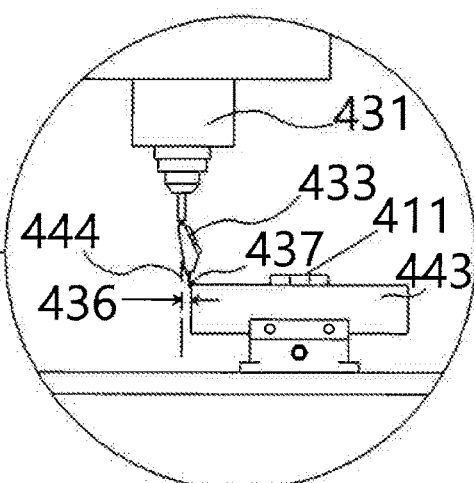
FIG. 31  FIG. 31a

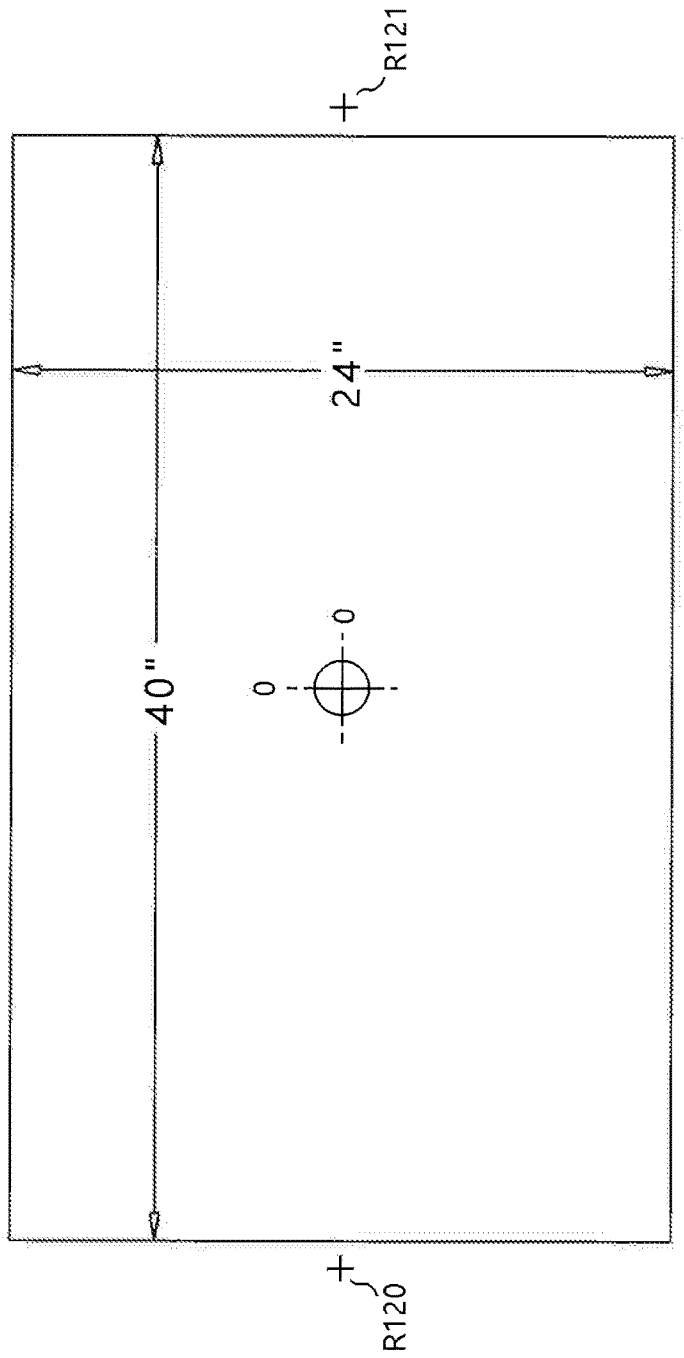

MACHINE TOOL INSPECTION

CROSS-REFERENCE TO RELATED APPLICATION

This non-provisional application claims priority to non-provisional application Ser. No. 16/252,248 filed on Jan. 18, 2019 which claims priority to provisional application No. 62/674,712 filed on May 22, 2018 and to provisional application No. 62/558,134 filed on Sep. 13, 2017 and to non-provisional application Ser. No. 15/133,411 filed on Apr. 20, 2016 now U.S. Pat. No. 10,184,775 all of which are owned by the same inventor.

FIELD OF THE INVENTION

The present invention relates to a method used to precisely examine the quality of a machine tool's performance.

BACKGROUND OF THE INVENTION

Cutting tools used in CNC machines are made to nominal sizes but rarely measure the precise size to which they were designed. The precision machining of components serving many industries becomes more demanding each passing year. Computerized Numerical Control, or CNC, machine tools become more advanced, software programming becomes more powerful, and new cutting tools grow in user acceptance based on their particular strategy. Throughout all of these continuing improvements with technology, one variable goes overlooked: a nominal size tool does not always measure its designed precise size.

Precise work pieces undergo manufacturing with the use of CNC machines, very accurate and precise themselves. A CNC machine tool has three linear axes of motion while more advanced CNC machine tools have four axes, five axes, or more. CNC machine tools have advanced far and repeat toolpath positions reach well within 0.0002" (two ten-thousandths of an inch).

Machine tool programming software plays a vital role in achieving efficient toolpaths in CNC machines. To achieve this, an operator must program accurate toolpaths at the machine or through offline computer-aided manufacturing software, or CAM. CNC programs, or tool paths, have a primary basis from the size of tool specified. Toolpaths have accuracy to or finer than 0.0002" (two ten-thousandths of an inch). Tooling used in machining centers has rapidly grown in size and shape. Specific tool geometry also meets certain criteria to achieve specific tool path strategies. These tools have a common construction from high speed steel, cobalt, and carbide whether from a solid material, or component, or two or more materials, or components, commonly known as indexable tools. Tools have designs to standard nominal sizes in both imperial and metric units.

With the investment in a CNC machine, CAM software, and dedicated tooling, operators, or machinists, expect high quality results to precisely machine components. However this is not always the result.

More often than not, a tool does not measure the exact nominal size of its design. Software continues to apply paths correctly within 0.0002", the machine tool continues to repeat a toolpath within 0.0002", but the cutting tool more commonly varies and becomes the reason behind low quality results.

A machinist has difficulty measuring tools with hand instruments. Tools have very fine cutting edges, sometimes an odd number of flutes, or sometimes variable flute geometry, just to name a few hindrances to the machinist. Tools very rarely measure their nominal size within 0.0002" (two ten-thousandths of an inch). Some CNC machines offer an electronic means to measure a tool however, such machines will not always identify the condition of a tool with multiple flutes.

BACKGROUND OF THE INVENTION

Computerized numerical control, or CNC, machines provide accurate positioning for milling and drilling operations but over time do not position within their designed tolerances due to wear, age, or micro debris.

CNC machines position to within 0.0002 inch, two ten-thousandths of an inch. In the die/mold industry, many work pieces have mating features which require this high tolerance positioning. Mating features machine within such tolerance to accept their designed fit precisely. CNC machine tool operators meet these requirements when they know they control an accurate machine.

Machine tools undergo individual testing to their original equipment manufacturer, or OEM, specifications by means of mechanical positioning tests using a telescoping magnetic bar. But, this adequate test does not provide real world results. Often, this test is not necessarily performed by the designated machine operator who performs the accurate programming adjustments on a daily basis. Furthermore, no mechanical evidence accumulates to show qualification of the machine.

Work pieces, produced in manufacturing facilities, often require a quality room for an inspection after their machining operations. A Coordinate Measuring Machine, or CMM, allows an operator to inspect work pieces against their designed tolerances. This process focuses primarily on measuring of the finished work piece and often overlooks the quality of the machine tool that performs the work.

The manufacturing of work pieces with machine tools offers precisions repeatable results. To qualify these results, operators must use hand tools and other precision instruments to inspect work pieces before, during, and after machining processes. Hand tools, such as micrometers and calipers, have regular use by machinists however that introduces human error during routine usage.

In the die/mold industry, many work pieces have mating features which require high tolerance dimensions. The outside periphery of parts commonly requires this precision tolerance. These surfaces must stay within their given tolerance despite tool wear and tool deflection.

Machinists use micrometers to qualify the outside periphery of parts however at less accuracy than test indicators. Work pieces may have too large a size to accurately measure with a micrometer due to micrometer weight, availability, and the design of the profile.

Test indicators work extremely well transferring measurements. Test indicators have common usage on surface plates to transfer dimensions from a known gage. This practice eliminates human error and provides high quality inspection results. Test indicators also see use in machine tools to locate origins and reference surface edges. Test indicators work well for aligning fixtures, such as machine vises, and for verifying flatness. Flatness verification works very well; however, it does not provide actual measurements.

Tool probes also assist machinists to measure machined features on machine tools. Tool probes have designs and designations for specific machine tools. Therefore, tool probes interchange less between different machine tools compared to test indicators. The machine specific hardware and software required to operate tool probes limits their efficiency because they required well trained, skilled operators. Because of machine specific design hardware and software, tool probes have become too costly to use on all machine tools.

DESCRIPTION OF THE PRIOR ART

The U.S. Pat. No. 5,813,128 to Bailey shows an adequate calibration test using a ball bar and that requires processes used outside of daily manufacturing practices. The ball bar shown in this patent has a ball upon each end for placement in two ball and socket joints. This calibration tool though does not represent and does not produce mechanically tangible results.

SUMMARY OF THE INVENTION

The invention is a method of using a mechanical device to verify the performance on a machine tool. The quality of a machine tool is defined by its operational results. The method provides a tangible way of defining the value of a machine tool based upon how tight or how precise it operates. All workpieces being inspected or machined require a machine setup based upon a plane, orientation, and an origin.

Newly designed machining and inspection machine tools are set to a specific set of tolerances when built. With the industry's high demand for precision and growing technology these tolerances or specifications become outdated. These tolerances or specifications also become invalid over time due to machine wear and lack of design. Using the method of measuring a machine tool's performance identifies its current day status.

The machine tool test fixture serves as a standard fixture in a CNC machine and a CMM to verify the quality of a CNC machine tool and a CMM. The fixture has the same plane, origin, and orientation duplicated accurately during setup in a CNC or a CMM. The tooling hole located in the center of the fixture allows for repeating the origin. The bottom of the legs machined flat and parallel with the top surface of the body, defines a plane identical in both the CNC and the CMM. A witnessed edge of the body provides a surface to set the straightness orientation in both the CNC and the CMM. The fixture accepts test heads for mounting on the top of the body by precise fastening at a nominal distance set from the tooling hole.

Machine inspection can furthermore be carried out with the use on an indicator with the on-machine inspection block. This method is a quick setup of an indicator to verify a surface by transferring a known radial sweep distance from a precision bore.

There has thus been outlined, rather broadly, the more important features of the invention in order that the detailed description thereof that follows may be better understood and that the present contribution to the art may be better appreciated. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is identifying the quality of a machine tool based upon its results from operational use.

Another object of the present invention is to provide a device that has versatility across all machine tools.

Another object of the present invention is to provide a marketing tool to sell high precision machine tools.

One object of the present invention is to provide a gage device to setup and transfer measurements with a test indicator for measuring surfaces on work pieces in machine tools.

Another object of the present invention is to overcome counter-productivity to re-setup work pieces in machine tools due to out of tolerance dimensions.

Another object of the present invention is to provide a method of measuring a machine tool's squareness, parallelism, positioning, and circularity combined in one setup.

The on-machine inspection block has a flat device with a precision bore. The device has a top surface and a bottom surface both parallel with each other so the operator can verify flatness of the gage prior to aligning the test indicator. The bottom surface of the device has a relief in the center area to prevent dirt and debris from causing inaccurate setups. The relief allows the device to rest flat using the bottom surface outwardly of the relief, or outer land, upon the sides and ends. The bottom of the device has pockets for magnetic inserts. The magnetic inserts hold the device in place during the inspection operation. The magnetic inserts have enough strength to hold the device in place yet offer limited resistance for hand removal of the device.

The device has a non-magnetic metal construction. The Applicant specifies this because of the test indicator's contact and use with the device. The test indicator has vulnerability to magnetic fields. Magnetic pulls can distort the test indicator stylus from providing accurate results. Using a non-magnetic metal prevents the test indicator from displaying any readings outside mechanical measurements.

Throughout a machining process, qualifying features upon their machining leads to a precise product. Establishing in-tolerance dimensioned features during the machining process has a number of benefits. The thermal changes in a machine tool no longer become a variable. Over the course of a day, thermal changes in machine tools can cause the part setup origin or datum to change based on the quality of the machine tool. Cutting tool life also appears more identifiable during the sizing of dimensional features. Cutting tool life and tool wear then appear most identifiable immediately following with on-machine inspection processes. Changes with the machine tool operators can also lead to uninformed critical details that affect the final work piece. Machine tool operators can produce quality work pieces when they knowingly have an accurate part origin, understand the quality of cutting tool, and precisely inspect their work. The indicator setup block allows operators to inspect work pieces during the machining operation eliminating thermal issues, cutting tool identification issues, and operator change issues.

The device serves as a precision instrument that provides repeatable results for all machine tool operators. Using the device requires little to no fine adjustments to measure work piece surfaces. The device has versatility compatible with machine tools that utilize a spindle and a digital readout.

Test indicators have use on surface plates to transfer measurements from one high peak to another. The test indicator has a loading using a gage block to transfer this measurement. This high quality practice has become routine for many in the trade. The indicator setup block uses a test indicator in a machine tool spindle. The indicator setup block abuts a test indicator loaded at a constant radial contact point to establish its radial measurement. The machinist then transfers this radial measurement to work pieces at the test indicator's highest peak of contact to find a measurement. The on-machine inspection indicator setup block takes a constant radial value from a precision bore and applies it to the highest peak of contact at a radial distance from a surface.

BRIEF DESCRIPTION OF DRAWINGS

In reference to the drawings,
FIG. 3 is a front view of a machine spindle with the diameter gage installed;
FIG. 3a is a detail view;
FIG. 4 is a front view of a machine spindle with a cutting tool installed;
FIG. 4a is a detail view;
FIG. 11 is a table of results utilizing the standard tool diameter gage;
FIG. 15A is the top view of the left test head;
FIG. 15B is the top view of the right test head;
FIG. 16A is the front view of the left test head;
FIG. 16B is the front view of the right test head;
FIG. 17A is the bottom view of the left test head;
FIG. 17B is the bottom view of the right test head;
FIG. 27C is a top view of the preferred embodiment in usage;
FIG. 27D is a side view of the preferred embodiment in usage;
FIG. 27E is a front view of the preferred embodiment in usage;
FIG. 27F is a side view opposite FIG. 27D of the preferred embodiment in usage;
FIG. 27G is a top view of the alternate embodiment in usage;
FIG. 27H is a side view of the alternate embodiment in usage;
FIG. 27I is a front view of the alternate embodiment in usage;
FIG. 27J is a side view opposite FIG. 27H of the alternate embodiment in usage;
FIG. 30 is a front view of a machine tool having the setup block placed beneath a spindle;
FIG. 30a is detail view of FIG. 30;
FIG. 31 is a front view of a machine tool having the setup block placed to the side of a spindle;
FIG. 31a is a detail view of FIG. 31;
FIG. 32 is a top view of a work piece surface to verify with the setup block;
FIG. 33 is a table of results from verifying with the setup block.

The same reference numerals refer to the same parts throughout the various figures.

DETAILED DESCRIPTION OF THE INVENTION

The Standard Tool Diameter Gage, offers the ability to accurately measure a cutting tool in or outside a machine tool.

With its precise size and capability to be easily mounted into a machine spindle or fixture the Standard Tool Diameter Gage serves as an excellent method to measure tool sizes.

Figure 1A:
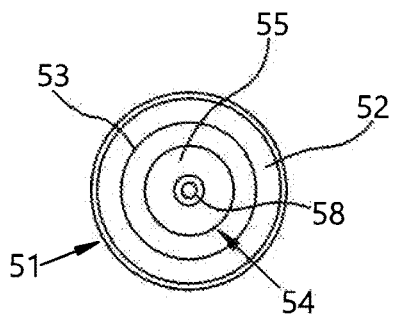
FIG. 1A is a top view of the diameter gage.
Figure 2A:
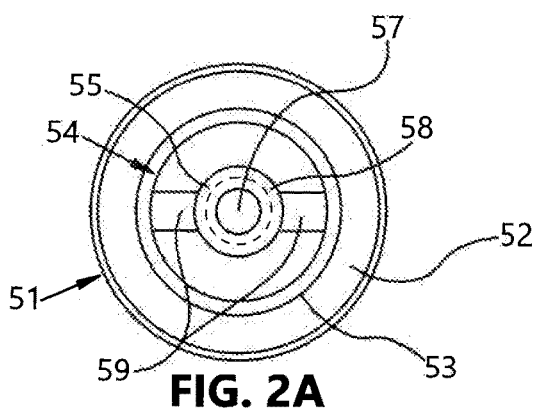
FIG. 2A is a top view of the alternate embodiment.
Figure 1:
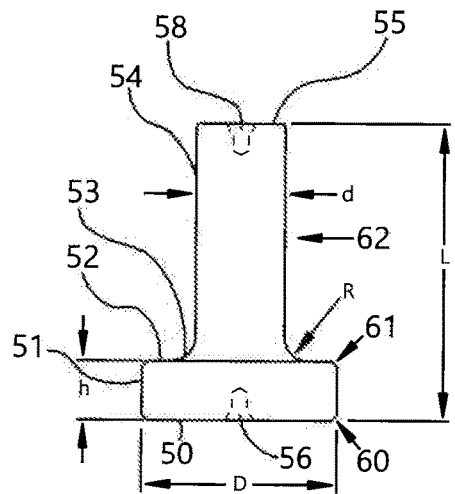
FIG. 1 is a front view of the diameter gage.
Figure 2:
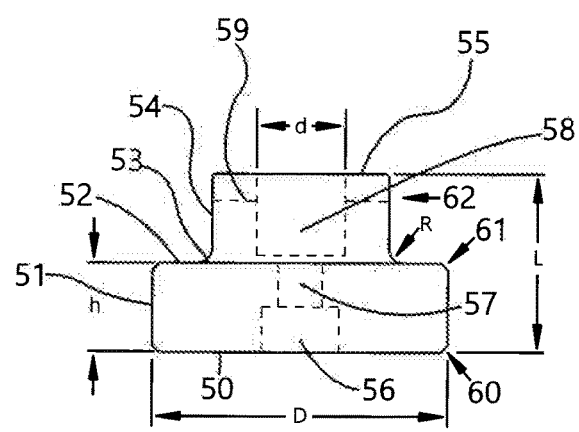
FIG. 2 is a front view of an alternate embodiment of the diameter gage.

FIG. 1 and FIG. 2 show the operating dimensional characteristics of the tool gage. "D" represents the main measuring diameter, or gage diameter, of the standard tool diameter gage. "d" represents the shank or arbor size. "h" represents the land area of the measuring diameter. The measuring diameter can be a minimum size of 0.09375 inches and a maximum size of 24.000 inches. "R" represents the corner where a radius assists in manufacturing. "L" is the overall length of the gage, standard tool diameter gage, or device. FIG. 1 shows a front view of a round cylindrical shaped head 62.

Figure 1B:
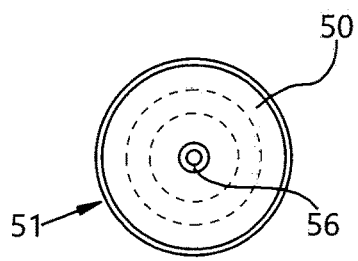
FIG. 1B is a bottom view, opposite of that of FIG. 1A.

FIG. 1 is a front view of the standard tool diameter gage with a shank 54 for mounting. An aperture 56, or first aperture, and aperture 58, or second aperture, are shown in the center of a nose 50 and an end 55, respectively. Then, FIG. 1A is a top view of the standard tool diameter gage shown in FIG. 1. And, FIG. 1B is a bottom view opposite of that of FIG. 1A. All geometry and features are concentric between FIGS. 1, 1A, 1B.

Figure 2B:
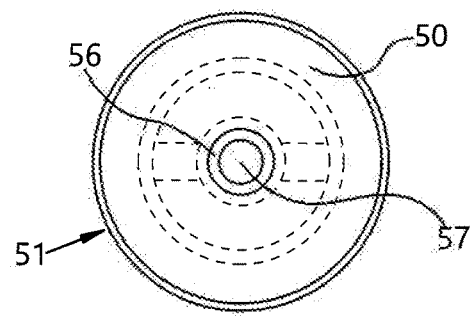
FIG. 2B is a bottom view opposite of FIG. 2A.

FIG. 2 is a front view of the alternate embodiment of the standard tool diameter gage with a pocket 58 for mounting. The aperture 56 and aperture 58 are shown in the center of the nose 50 and the end 55. Then, FIG. 2A is a top view of the alternate embodiment with a horizontal slot 59 is shown located on the end 55. And, FIG. 2B is a bottom view opposite of FIG. 2A where the face 51, aperture 56, and aperture 57 are concentric.

FIG. 1 shows a front view of the standard tool diameter gage. The first diameter as at D is the gage size of the device that is manufactured to precise nominal values. The second diameter as at d is the shank of the device used for mounting into a tool holder. The gage has a nose 50 with a face 51 that abuts a block later shown. The nose 50 of the gage is perpendicular to the face 51 and has a flat form. The face has a parallel orientation to the shank and extends circumferentially about the nose. The face 51 also has as its diameter D, main diameter, or face diameter measured to within 0.0002 inches. More particularly, h is the height of the face, or thickness of the head. The face has its height h less than the length L of the standard tool diameter gage, preferably less than one quarter of the length L as shown. The face 51 and the shank 54 are concentric to each other within 0.0001 inch. The concentricity deviation between the face 51 and the shank 54 must be held to a minimum to prevent inaccuracies. Measuring within ten thousandths of an inch (0.0001) any inaccuracies between the face 51 and the shank 54, and the face 51 and the gage diameter, will compound error when determining the actual tool size as later mentioned. The concentricity tolerance between the face 51 and the shank 54 needs to be less than one ten thousandths of an inch (0.0001). Moreover, the shank 54 is centered upon the head, that is, centered behind the nose. A shoulder 52 is perpendicular to the face 51 and is tangent to a neck 53. The neck 53 has a small radius which serves as a transition between the shoulder 52 and a shank 54 and the neck flares outwardly and downwardly from the shank to the shoulder. The shoulder has a greater diameter than the shank. The shoulder merges and tapers into the head opposite the nose as shown. The shank 54 is dimensionally longer than the face 51 for clamping and has an end 55 which is parallel to the nose 50. The shank 54 is of a round, cylindrical shape and has parallel sides when shown in a front, a side, or a back view. The shank has its diameter d generally less than the diameter D of the nose 50. The width of the standard tool diameter gage steps inwardly from the diameter D of the nose to the diameter d of the shank as shown. The neck flares outwardly from the shank, opposite the end and its second aperture. The neck merges into the shoulder, outwardly from the shank. The shank 54 mounts and clamps into a tool holder and extends a portion of its length outwardly from the tool holder. A first aperture 56 is located in the dead center of the device on the nose 50. A second aperture 58 is located in the dead center of the device on the end 55, and opposite the nose. The end 55 is smaller in size in comparison to the nose 50. The first aperture 56 and the second aperture 58 are blind apertures that are drilled in the centerline of the device. The first aperture 56 and the second aperture 58 are shallow in depth and that have sixty degree inclusive bevels at their entries. The first aperture and the second aperture have a common center, concentric with the centerline, that is, longitudinal axis of the shank 54. The first aperture 56 and the second aperture 58 serve as centers for aid in manufacturing. The standard tool diameter gage allows an operator to insert the end 55 into a spindle of a CNC machine tool for referencing it to a setting on a test indicator as later shown.

The neck 53 follows a curve with a radius of R as shown. The radius R of the curve varies from about 5% to about 10% of the face diameter D. From the neck through the shoulder to the face, the face has its height h as shown. The height of the face h extends from about 0.25 inch to about 1.00 inch. The face height also forms a portion of the length L of the standard tool diameter gage. The length L extends from about 2.5 inches to about 10 inches. Alternatively, the face height varies from about 2.5% to about 10% of the length L. As mentioned above, the standard tool diameter gage has a generally round form and is thus symmetric FIG. 1A shows a top view of the device shown in FIG. 1. The end 55 is in the center of the shank 54 and retains the second aperture 58. The shank 54 is beneath and perpendicular to the end 55 and follows down to the neck 53. The shank is also perpendicular to the head and is opposite the nose 50. The neck 53 is adjacent to the shank 54 which is adjacent to the shoulder 52. The face 51 of the standard tool diameter gage hangs beneath the shoulder 52. The center of the end 55 is the second aperture 58. The face 51 and the shank 54 should be machined together preferably in the same manufacturing setup so that the face 51 is parallel and true to the shank 54 and the centerline of the shank. The shank 54 should be manufactured within one ten thousandths of an inch (0.0001) and should have a surface finish of 32 RMS, root mean square of profile height deviation from the mean line, or better.

FIG. 1B shows a bottom view of the device shown in FIG. 1. The nose 50 is the complete surface shown outside the first aperture 56. The nose 50 is the working end of the device. The face 51 of the device is perpendicular to the nose 50, that is, into the plane of this figure. This face 51 surface must be machined to a high tolerance with a smooth surface finish therefore to be used to establish a known indicator setting. The face 51 also should be manufactured within one ten thousandths of an inch (0.0001) and should have a surface finish of 32 RMS, root mean square of profile height deviation from the mean line, or better.

FIG. 2 shows a front view of the alternative embodiment of the standard tool diameter gage. This device has less height than the device in FIG. 1 and suits larger diameter gages. The second aperture 58 is a pocket that accepts an adapter on a tool holder. The nose 50 of the gage is perpendicular to the face 51. The face 51 also has as its diameter first diameter D, or main diameter. The face has its height h less than the length L of the standard tool diameter gage, more particularly, h as the thickness of the head is less than 51%, or fifty one per centum, of the length L of the device. In one embodiment, the face diameter is half or less of the length. The face 51 and the shank 54 are concentric to each other. The shoulder 52 is perpendicular to the face 51 and is tangent to the neck 53. The neck 53 is a small radius which serves as a transition between the shoulder 52 and the shank 54. The end 55 is parallel to the nose 50. The first aperture 56 is located in the center of the nose 50. The first aperture 56 is a clearance hole for a fastener used to mount the device to an arbor type tool holder. The second aperture 58 is a precise size that locates the device. The second aperture 58 must be machined concentric to the face 51 to eliminate inaccuracies. A throat 57 communicates through the first aperture 56, through the shank 54, and into the second aperture 58. The throat 57 moreover provides clearance for a fastener placed therein, not shown, during usage. The first aperture 56, the throat 57, and the second aperture 58 have a concentric positioning as shown. Also, the second aperture opens into the throat, the throat then extends within the shaft of the head, and the throat opens into the first aperture. Outwardly from the second aperture, this embodiment of the standard tool diameter gage has a slot 59 machine into the end 55. The slot 59 has a width markedly less than the diameter of the shank as shown in FIG. 2a and a depth markedly less than the length of the device. The slot guides an element of the spindle, not shown, during usage. The slot is opposite the nose.

FIG. 2A shows a top view of the alternate embodiment shown in FIG. 2. The end 55 is at the end of the shank 54. The shank 54 is perpendicular to the end 55 and follows down to the neck 53. The neck 53 connects to the shank 54 then to the shoulder 52. The face 51 of the device connects to the shoulder 52. When manufacturing the devices the face 51 needs to be machined perpendicular to the nose 50.

FIG. 2B shows a bottom view of the alternate embodiment shown in FIG. 2. The throat 57 is in the center of the device. The first aperture 56 travels around the throat 57. The nose 50, appears as the surface shown outside of the first aperture 56. The face 51 of the device is perpendicular to the nose 50. The nose 50 is the working end of the device. The face 51 is manufactured with a high tolerance and is used to transfer a measurement. The distance from the center of the device to the face 51 is a known radial value. The face 51 should be manufactured within one ten thousandths of an inch (0.0001) and should have a surface finish of 32 RMS, root mean square of profile height deviation from the mean line, or better.

Figure 2C:
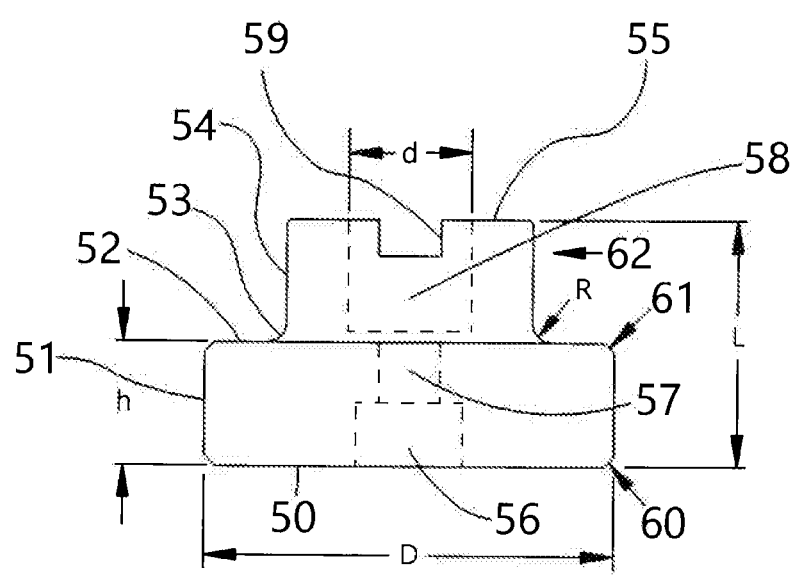
FIG. 2C is a side view of the alternate embodiment.

Turning to FIG. 2C, this alternate embodiment has the slot 59 upon the end 55. The slot 59 extends slightly into the shank 54 and generally less than the depth of the second aperture 58 and well before the throat. The slot spans the shank along a diameter and opens at the edge of the shank in two diametrically opposite positions. The slot has a U shape cross section and as an alternate embodiment, the slot has a rectangular cross section. Because the standard tool diameter gage has symmetry, one side view, FIG. 2C is provided.

FIG. 3 and FIG. 4 are front views that show a method used to obtain the precise size of a cutting tool used in a machining center. The CNC machine 9 has linear axes that allow the spindle 1 to be traversed. FIG. 3 is a front view of a machine spindle 1 with the standard tool diameter gage 3 installed showing the gage setting with an indicator 2, and FIG. 3a is a detail view. FIG. 4 is a front view of a machine spindle 1 with a cutting tool 4 installed showing the tool measurement off of the known indicator setting, and FIG. 4a is a detail view.

FIG. 3 shows a standard tool diameter gage 3 installed in a tool holder 7 located in a machine spindle 1. A CNC machine 9 with linear axes is shown with a spindle 1. An indicator 2 is shown set to a known position on the standard tool diameter gage 3. A contact point 5 of the indicator to the gage 3 has a setting at the highest peak of the gage 2 diameter (D) as also shown in FIG. 3a. The CNC machine 9 has a controller 8 for operating a program and manually joggling the spindle 1. The indicator block 6 is shown with an indicator 2. An indicator block 6 allows the indicator 2 to be securely mounted beneath the spindle 1.

FIG. 4 shows a cutting tool 4 installed in a tool holder 7 located in a machine spindle 1. An indicator 2 measures the deviation from the original setting in FIG. 3. The contact point 5 of the indicator to a cutting tool 4 is measured at the highest peak of the cutting edge as also shown in FIG. 4a. This measurement shown on the indicator 2 determines the precise size of the cutting tool 4.

Figure 5:
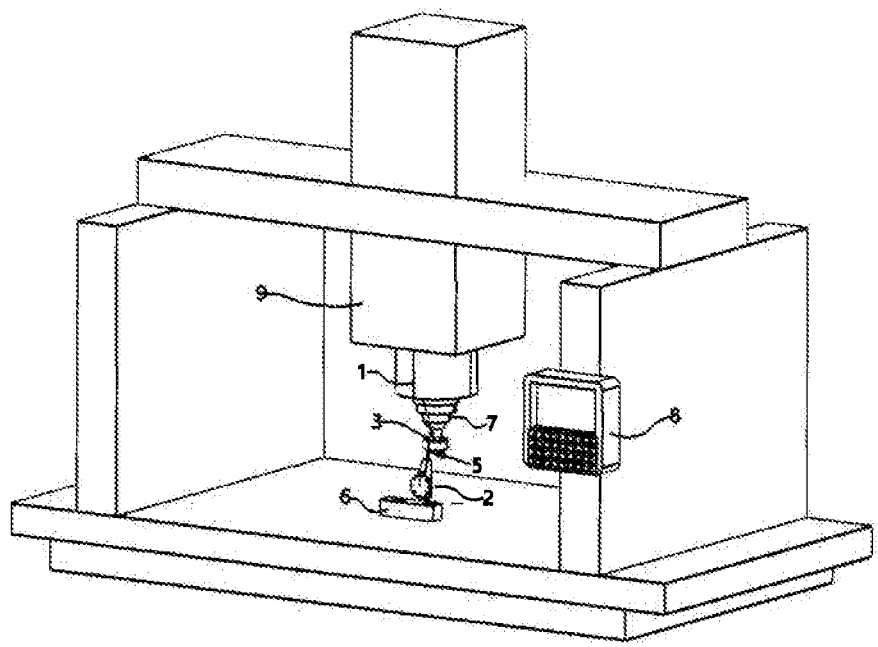
FIG. 5 is an isometric view showing a machine spindle with the diameter gage installed.

FIG. 5 is an isometric view showing a machine spindle 1 with the standard tool diameter gage 3 installed. And following, FIG. 6 is an isometric view showing a machine spindle 1 with a cutting tool 4 installed.

FIG. 5 is an isometric view of FIG. 3. A CNC machine 9 with linear axes is shown with a spindle 1. A CNC machine 9 has a controller 8 for operating a program as well as joggling the spindle 1. This view shows the relation between the indicator setting and the standard tool diameter gage 3. FIG. 5 shows how a machine spindle 1 having a gage 3 should be positioned closely to an indicator 2 to make the preferred setting.

Figure 6:
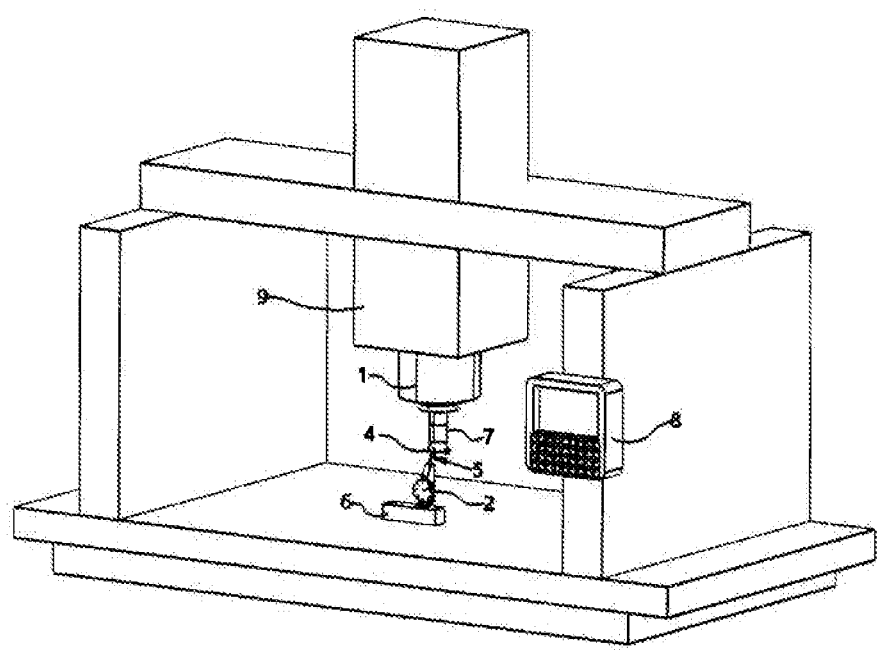
FIG. 6 is an isometric view showing a machine spindle with a cutting tool installed.

FIG. 6 is an isometric view of FIG. 4. This view shows the relation between the indicator 2 setting and the cutting tool 4 being measured. FIG. 6 is the same as FIG. 5 but with a difference of a cutting tool 4 installed in the spindle 1. FIG. 6 shows the deviation of the indicator setting made in FIG. 5 from that of the highest peak of the cutting edge on the cutting tool 4. The value on the indicator 2 is the measurement from which the nominal diameter size is calculated. A positive indicator value determines the cutting tool 4 is oversize from the nominal size. A negative indicator value determines the cutting tool 4 is undersize from the nominal size.

Figure 7:
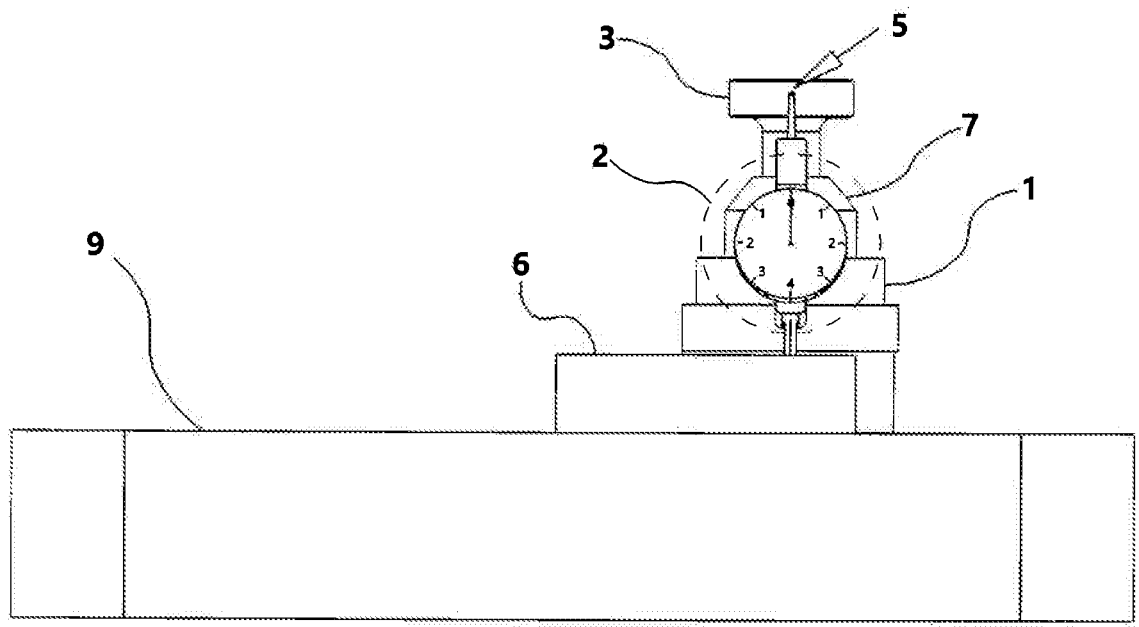
FIG. 7 is a front view of a fixture outside of a machining center with the diameter gage installed.
Figure 8:
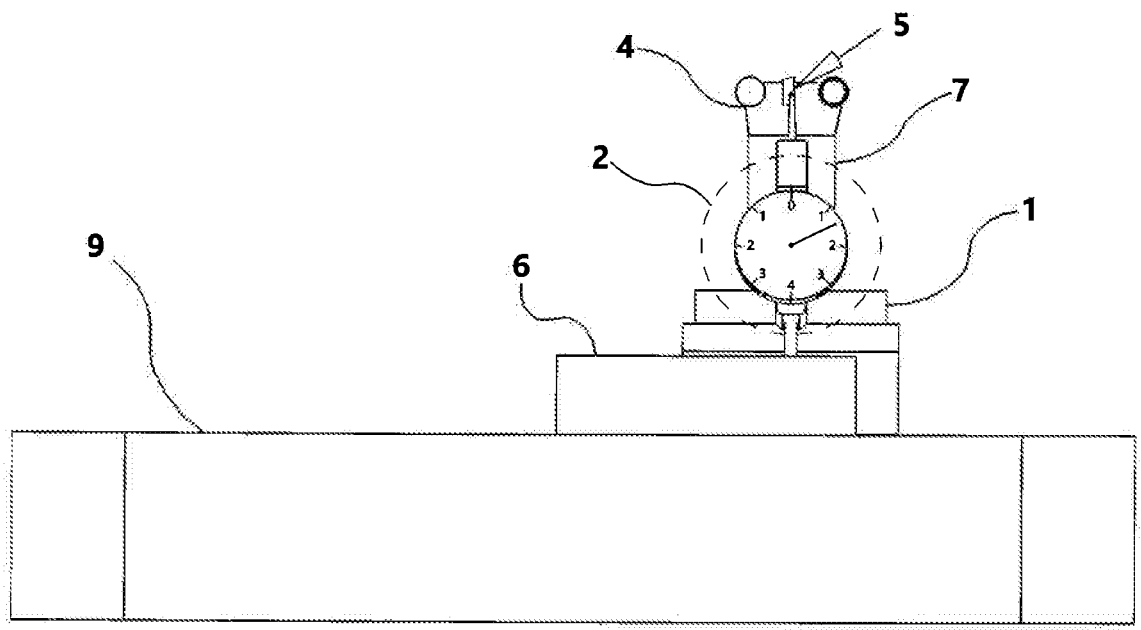
FIG. 8 is another front view of a fixture outside of a machining center with a cutting tool installed.
Figure 9:
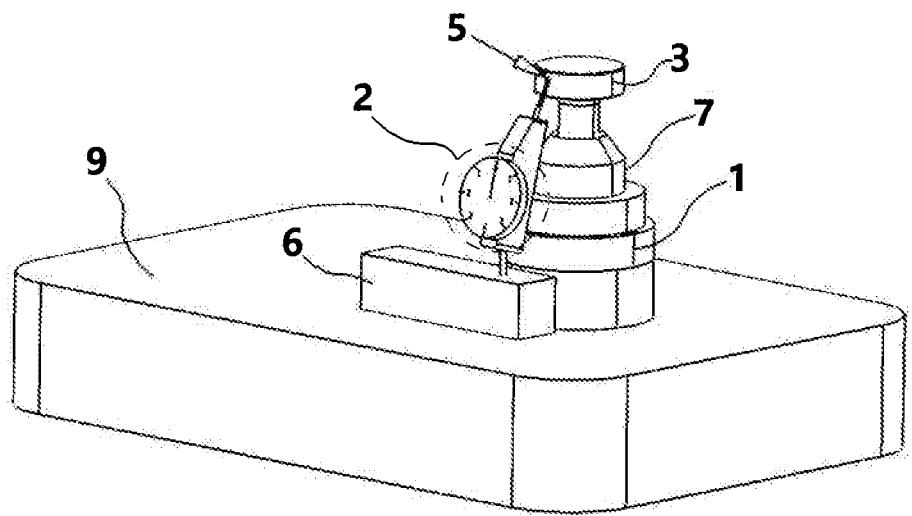
FIG. 9 is an isometric view showing a fixture with the diameter gage installed.
Figure 10:
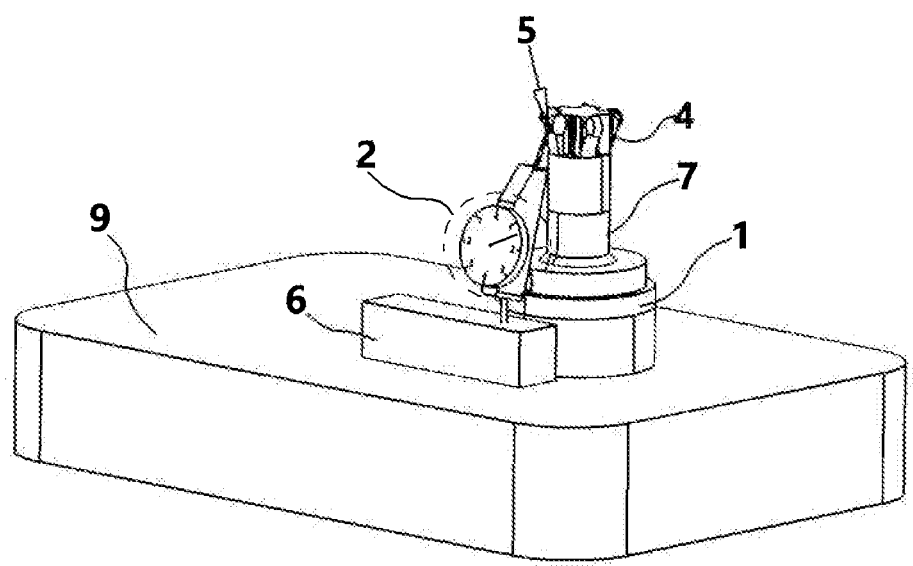
FIG. 10 is an isometric view showing a fixture with a cutting tool installed.

The process shown in FIGS. 7-10 is referred as an offline process because the time used to determine the actual cutting tool size is done outside a machining center. FIG. 7 is a front view of a fixture 9 outside of a machining center with the standard tool diameter gage 3 installed showing the gage, setting with an indicator 2. FIG. 8 is another front view of a fixture 9 outside of a machining center with a cutting tool 4 installed showing the tool measurement from a known indicator setting. FIG. 9 is an isometric view showing a fixture 9 with the standard tool diameter gage 3 installed. FIG. 10 is an isometric view showing a fixture 9 with a cutting tool 4 installed.

FIG. 7 and FIG. 8 are front views of the method used to obtain the precise size of a cutting tool 4 used in a fixture 9 outside of a machining center. FIG. 7 shows a standard tool diameter gage 3 located in a fixture 9 with a spindle 1. An indicator 2 is shown being set to a known position on the gage 3. A fixture 9 retains a spindle 1 that accepts a tool holder 7. The indicator 2 with an indicator block 6 is mounted near the spindle 1. The contact point 5 of the indicator to the gage 3 is set at the highest peak of the gage 3 diameter. In FIG. 7 the indicator 2 is positioned and set at one stationary point to be used again in FIG. 8.

FIG. 8 shows a cutting tool 4 placed in a fixture 9 with a spindle 1. An indicator 2 measures the deviation from the original setting in FIG. 7. The contact point 5 of the indicator to the cutting tool 4 is measured at the highest peak of the cutting edge. This measurement shown on the indicator 2 determines the precise size of the cutting tool 4. This precise height from the spindle to the cutting edge contact point may need to be predetermined prior to setting the standard tool diameter gage 3 in FIG. 7. The indicator block 6 with indicator 2 is positioned near the spindle for measuring. The cutting tool 4 assembled in a tool holder 7 is shown taking a measurement off of the indicator 2.

FIG. 9 is an isometric view of FIG. 7. This view shows the relation between the indicator 2 setting and the standard tool diameter gage 3. FIG. 9 shows how a spindle 1 in a fixture 9 with the gage 3 should be positioned closely to an indicator to make the preferred setting. Some cutting tools have small surface areas of contact. Without having a CNC machine with a controller to adjust the contact height of the cutting tool contact point 5, as also later shown in FIG. 10, the cutting tool height may need to be predetermined so the indicator 2 is not moved. The indicator block 6 and indicator 2 must be kept in one stationary position for precise results.

FIG. 10 is an isometric view of FIG. 8. This view shows the relation between the indicator 2 setting and the cutting tool 4 being measured. FIG. 10 shows the deviation of the indicator setting made in FIG. 9 from that of the highest peak of the cutting edge on the cutting tool 4. The value on the indicator 2 is the measurement from which the nominal diameter size is calculated from. A positive indicator value determines the cutting tool 4 is oversize from the nominal size. A negative indicator value determines the cutting tool 4 is undersize from the nominal size.

The standard tool diameter gage has a method for its use included. The process of measuring a cutting tool to obtain its exact precise size is a two step process which is illustrated in FIGS. 3, 4, 7, 8. The two step process has been magnified into the following steps to highlight the critical details of the process. The method includes the following steps:

First, install the gage in a spindle. Once the preferred cutting tool 4 is selected for use it will determine the size of the standard tool diameter gage 3 to use. As shown in FIG. 3, a standard tool diameter gage 3 is installed in a tool holder 7 and is then mounted in a spindle 1.

Second, set an indicator with the gage. The spindle 1 assembly is traversed to a test indicator 2 which preferable has a dial graduation of 0.0001. As shown in FIG. 3, the indicator stylus should be loaded to a common value shown on the dial. Setting this point with the indicator should be done on the highest peak of the standard tool diameter gage 3.

Third, verify the contact point 5 has been achieved. Traverse the standard tool diameter gage back and forth across the indicator to ensure this highest point of contact has been reached. Furthermore manually rotate the spindle to ensure there is no run out as to this would offset the measurement. This new indicator set point will be used to test the cutting tool.

Fourth, retract and remove the standard tool diameter gage 3 from the spindle 1. The indicator 2 and the indicator block 6 must be kept in a stationary position. It is important that the indicator 2 is not adjusted or bumped after this initial setting. The point of contact on the indicator 2 from the center of the spindle is now a known radial value.

Fifth, install the cutting tool 4 in a spindle 1. As shown in FIG. 4, the selected cutting tool 4 installed in a tool holder 7 is mounted in a spindle 1. The cutting tool should be cleaned and clear of any debris from previous manufacturing use.

Sixth, reference the cutting tool to the set indicator. It is important that the indicator 2 is not adjusted or bumped from the initial setting from the second step.

Seventh, verify the indicator reading. By slowly rotating the spindle, find the highest peak 5 of the cutting edge on the cutting tool 4. Commonly rotate the cutting tool in the reverse rotation of its cutting use. This allows the indicator 2 to be loaded with little resistance by testing the relieved portion of the cutting edge first. This keeps the indicator 4 in a stationary position.

Eighth, record the measurement. The measurement reading taken and shown in FIG. 4 can be a positive or negative value based off the initial setting in step 1. A positive reading will indicate the tool is oversize of that of the nominal tool size. A negative reading will indicate the tool is undersize of that of the nominal tool size. And, Ninth, calculate the discovery. The indicator reading on the test indicator is a radial value. The value (whether positive or negative) must be multiplied by 2 in order to add or subtract to the nominal diameter to determine the cutting tool's precise size.

FIGS. 7, 8 show the same method as described in FIGS. 3, 4 but use a fixture 6 outside of a machine tool.

In FIG. 1 and FIG. 2 the nose 50, the face 51, and the shoulder 52 are described as the head of the mechanical device. The face 51 is a surface that spans continuously around the perimeter of the nose 51. The face 51 has 2 bevels as at 60 and 61 that run continuously and circumferentially around the nose 51 and shoulder 52 respectively which are adjacent to the face. The profile of the standard tool diameter gage is similar to a cutting tool however the face 51 is a continuous surface with no cutting edges or relief areas. The bevels 60 and 61 provide breaks to remove sharp corners for handling and provide lead-in surfaces for setting an indicator to the face 51.

FIG. 1 represents a standard tool diameter gage manufactured from one piece of steel. For larger standard tool diameter gages two piece designs welded together are more cost efficient to manufacture. FIG. 2 and FIG. 2A show a horizontal slot 59 to accept drive keys in a tool holder. The horizontal slot 59 orients the standard tool diameter gage to a tool holder and provides clearance to accept drive keys.

FIG. 11 displays a table showing results of measurements found using the standard tool diameter gage against a selection of different size cutting tools ranging from ½ inch to 6 inch in diameter. The table contains four columns from the left: Nominal Tool Size, Decimal Equivalent, Indicator Reading, and Actual Tool Size.

For the most accurate and consistent results Actual Tool Size is measured and identified at room temperature, sixty-eight degrees Fahrenheit.

The Nominal Tool Size column displays the cutting tool diameter chosen for measurement. This size is the value used when programming a toolpath strategy. Nominal Tool Size, either imperial or metric, shows inches and millimeters respectively. For CNC programming the Nominal Tool Size represents the selected cutting tool diameter based upon the machining of work piece features. Often overlooked, this value should be precise and reviewed by a machinist to measure the value of its Decimal Equivalent.

The Decimal Equivalent column displays the value of the Nominal Tool Size in a four place decimal callout, that is, four digits after the decimal point. Programming machine tools requires this four place decimal callout. Precise work pieces require precise programming. The Decimal Equivalent serves as the programming value for machine tools. In the Decimal Equivalent column all metric tool sizes have been converted to imperial units in a four place decimal callout.

The Indicator Reading column is the measurement taken from using the standard tool diameter gage against its Nominal Tool Size. Using the standard tool diameter gage this measurement value is found and illustrated in FIGS. 4a, 6, 8, 10. This measurement can be a positive (+) or a negative (−) value. A positive measurement value identifies that the tool size is larger than its Nominal Tool Size. A negative measurement value identifies the tool size that is smaller than its Nominal Tool Size. Positive values, or larger tool diameters, will remove more material from the work piece than programmed. Negative values, or smaller tool diameters will leave excess material on the work piece than programmed. The Indicator Reading has a radial value and subject to multiplication by 2 when calculating the Actual Tool Size.

The Actual Tool Size column shows the precise result identified from using the standard tool diameter gage. The Indicator Reading value is multiplied by 2 and added to or subtracted to the Decimal Equivalent to identify the Actual Tool Size. This value serves as the actual size for use when programming tool path strategies. Actual Tool Size goes to four digits after the decimal point, that is, a four place decimal callout.

In this selection of twenty different tool sizes shown in FIG. 11, the Actual Tool Size differs from its Nominal Tool Size in each instance. Actual Tool Size differs from the Nominal Tool Size ranging from as much as 0.0002 inch in diameter to 0.0380 inch in diameter. These Actual Tool Sizes are measurements for each of these specific cutting tools, based on its physical characteristics. Additional cutting tools with the same Nominal Tool Sizes as in FIG. 11 will display different results based on their physical characteristics. As a safeguard, tools with larger actual sizes than nominal should be discarded or replaced to prevent scrap work pieces.

Upon conducting the measurement series tabulated in FIG. 11, based on these Actual Tool Sizes the Applicant found the average amount of deviation from Nominal Size is 0.0057 inch in diameter. This amount of deviation from nominal is unexpected by the Applicant and well outside the acceptable tolerance of within 0.0002 in diameter. The standard tool diameter gage then has its gage diameter within 0.0057 inch of a nominal tool size attributed as shown, or as measured, as a reading upon a test indicator abutting the face. The standard tool diameter gage assists a machinist to know that the tool selected has the diameter intended.

The foregoing features, object, and advantages of the machine tool test fixture will become apparent to those skilled in the art from the following detailed description of the preferred embodiment, especially when considered in conjunction with the accompanying drawings. The Machine Tool Test Fixture provides a standard device for inspecting a machine tool's positioning, squareness, parallelism, and circularity.

Figure 12:
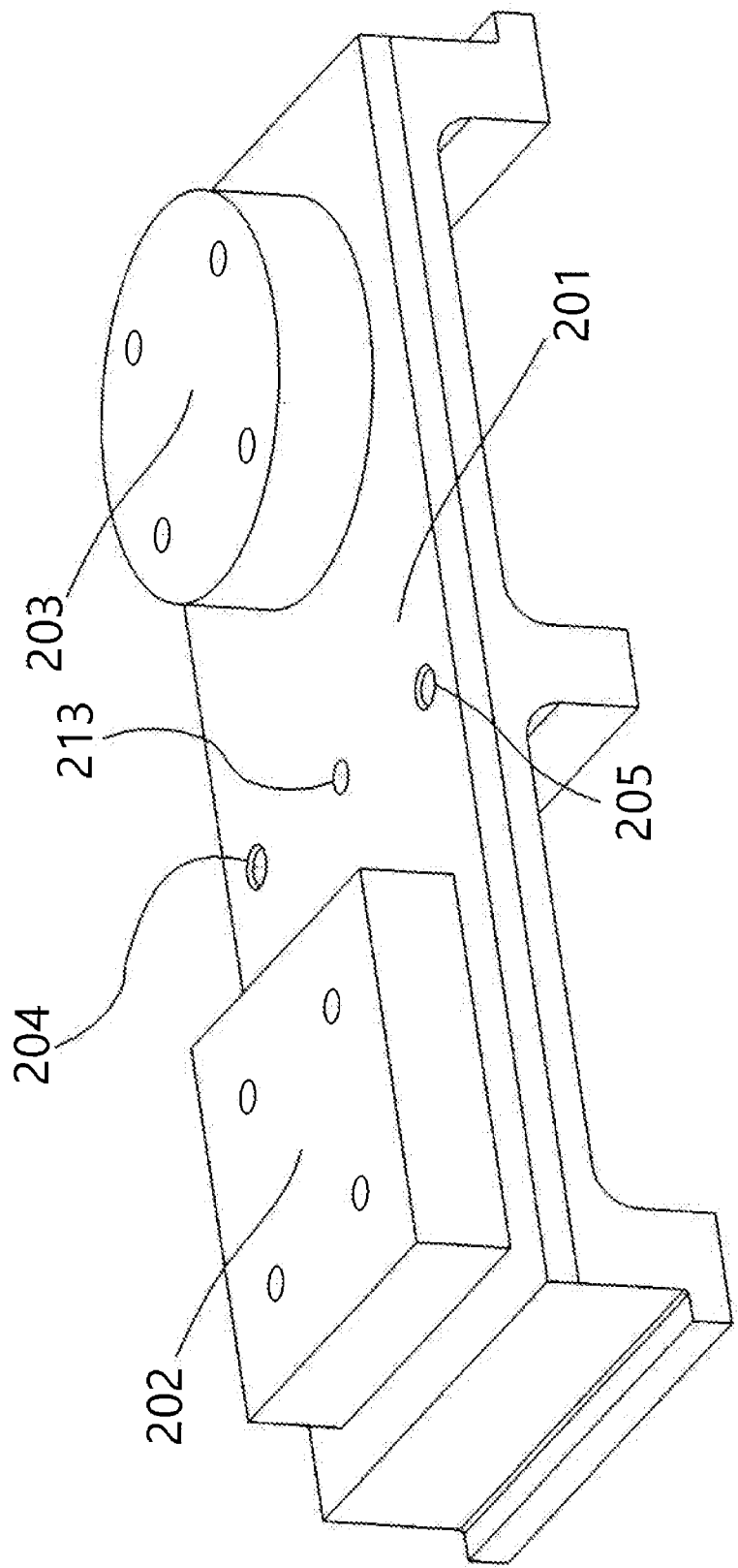
FIG. 12 is a perspective view of the test fixture.

FIG. 12 shows the assembly of the machine tool test fixture. The fixture body 201 is shown with a left test head 202 and a right head 203 mounted flat upon the body. The fixture body 201 has a tooling hole 213 installed in the center of the body. The fixture body has the left test head 202 and the right test head 203 positioned a nominal distance from the centerline of the tooling hole 213. The test heads have spacing from each other for room for an operator to use hand measuring tools, such as micrometers, when machining the heads on a CNC machine tool, not shown. The machine tool operator can identify the machine's integrity prior to the CMM inspection. The test heads 202, 203 exceed the height of the plane of the tooling hole 213. This height clearance allows the test heads to be qualified while maintaining a repeatable origin. Two spaced apart apertures 204, 205 have right hand threading the receives an eye bolt, not shown, or other mechanical hook, for lifting the entire test fixture 201 on a CNC machine table or on a CMM table. The lifting apertures have a generally centered position upon the body of the text fixture thus permitting even, controlled lifting of the over 60 pounds. For the most accurate results the test heads are measured at room temperature, sixty-eight degrees Fahrenheit.

The test fixture features both square and round geometric shapes for testing on its left head 202 and right head 203 respectively. Wear, age, and micro debris may cause CNC machines to position out of tolerance. Correcting this positional failure within the machine's parameters can fix the positioning of machining one geometric shape but not another. When adjusting the machine parameters, using a square test head and a round test head on the test fixture provides accurate machine results. The square test head and a round test head of the test fixture provide a user, or operator, a dual testing capability. The left head 202 and the right head 203 have tangent surfaces that are equally spaced from the center of the fixture body 201.

Figure 13:
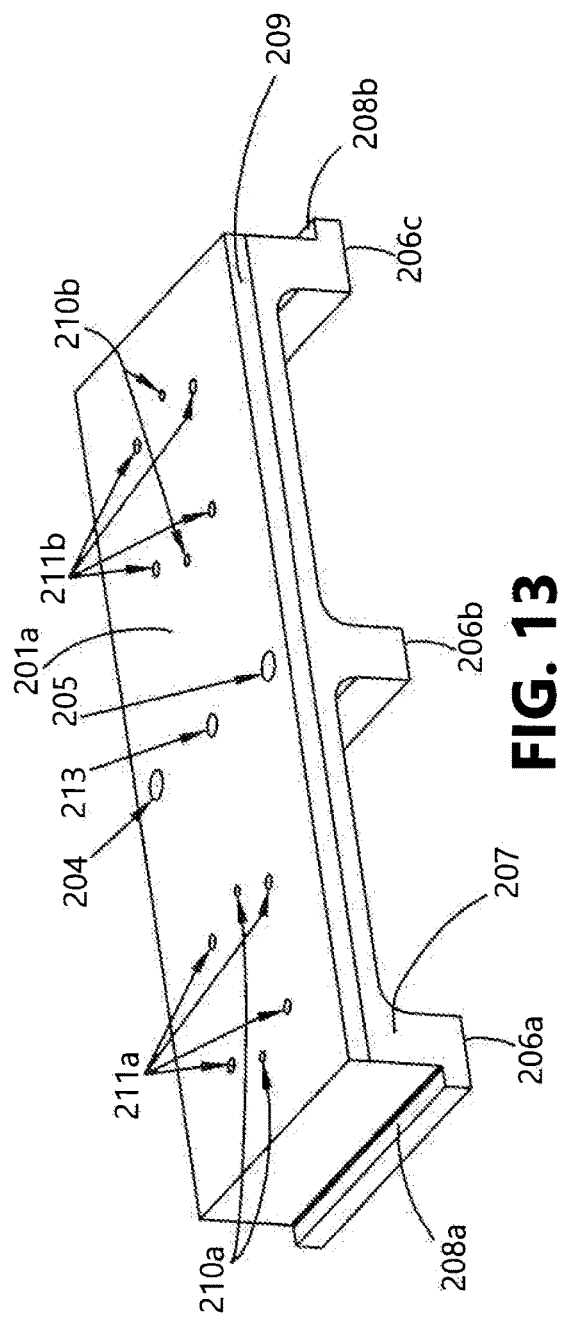
FIG. 13 is a perspective view of the test fixture body.

FIG. 13 shows an isometric view of the fixture body. A top surface 1a of the body contains the apertures 210a, 210b, 211a, and 211b used for mounting test block heads by the operator, or user, accessing them from below the top surface. The front 207 of the body is shown with a witnessed face 209. The body has a length parallel to the front 207 and a width perpendicular to the front, generally less than the length. Preferably the length is at least twice the width of the body. The top surface 201a of the body has an orientation mutually parallel to and spaced apart from a bottom plane defined through bottom surfaces 206a, 206b, and 206c of the body. The top surface has a spacing to the bottom surface causing a flatness of the top surface within 0.0005 in, five ten-thousandths of an inch at any two measuring positions. Upwardly from two outermost surfaces 206a, 206c as shown, the body 201 has two feet 208a, 208b. Any deviation of flatness outside this tolerance may cause the fixture body to curve, or to deflect, upon fastening the feet 208a and 208b to a machine table and thus resulting in inaccurate results regarding a machine, machine tool, or tool head.

The top surface 201a has many apertures used for positioning and fastening the test heads. The tooling hole aperture 213 supports a light press fit with tooling and has a position in the center of the top surface 201a. The aperture 213 has a tolerance of +0.000/−0.0005 in, plus zero/minus five ten-thousandths of an inch. Apertures 210a and 210b receive dowel pins, not shown, and have a position within 0.001 inch, one-thousandth of an inch. The apertures, 210a and 210b, support a press fit of the dowel pins, not shown, and must be to a tolerance of +0.000/−0.001 inch, plus zero/minus one-thousandths of an inch. The apertures in a group, as shown at 211a and 211b, each have threaded holes for fastening of the test heads, preferably right hand threading. Each apertures group, such as the pluralities shown at 211a and 211b, has the same pattern, with a minimum of three holes and typically four holes as shown. The pattern of apertures has a nominal distance from the tooling hole aperture 213. Preferably, the body 201 has two pluralities of apertures shown as groups 211a and 211b that receive the left test head 202 and the right test head 203 respectively. Threaded apertures 204 and 205 are positioned in the center of the fixture body.

The front face 207 of the fixture body 201, referred to as the CNC front, has a witness cut 209 along the top edge that travels the length of the body. This surface provides repeatable straightness orientation for setup and installation of the machine tool test fixture. The witness cut 209 should be straight within 0.0002 inch, two-ten thousandths of an inch, to process repeatable setups.

Figure 14:
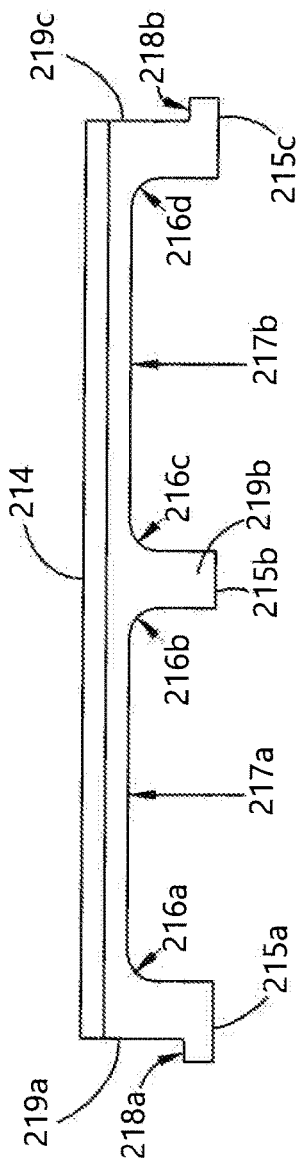
FIG. 14 is a front view of the fixture body.

FIG. 14 is the front view of the fixture body. The bottom of the body shown as 215a, 215b, and 215c has large slots 217a and 217b that extend through the entire width of the fixture. Slot 217a extends between bottom portions 215a, 215b, and slot 217b extends between bottom portions 215b, 215c towards the right in this figure. In the industry this view is referred to as the "CNC front," with the witness 209 forward to the user, often a machinist or operator. The top surface 201a serves as the uppermost portion of the body 201. The top surface though is a component of a top 214 having a width, a length, and a thickness. The top 214 has three legs 219a,219b and 219c depending there from. The three legs include two outer legs 219a, 219c and a center leg 219b. The two outer legs are mutually spaced apart and generally symmetric about the center leg. The two outer legs define the height of the body. The height of the body causes a user to raise a toolhead for ready comfortable measuring. Each leg extends downwardly from the top, that is, beneath the top surface, and terminates in a corresponding bottom surface 215a, 215b, 215c, respectively. The three legs are generally perpendicular to and opposite the top surface 201a. The outer legs are generally mutually parallel to the center leg. The bottom surfaces 215a, 215b, 215c, cooperatively form the bottom plane previously denoted as 206a, 206b, 206c. The left most leg, 219a, or outer leg, has an inner radius as at 216a. The center leg, 219b, has two spaced apart radii, 216a, 216b. And the right most leg, 219c, or outer leg, has its inner radius as at 216d generally opposite that of the radius 216a of the left most leg. These radii occur at the merging of the legs with the top 214 of the body 201. This thickened material strengthens and stiffens the knee merge of the legs, 219a, 219b, 219c, to the top just below the top surface 201a. More particularly, the left most leg 219a and the right most leg 219c, have feet 218a, 218b respectively that extend 90 degrees, or perpendicular, to the height of each leg, that is, oppositely outward. The feet, 218a, 218b allow for clamping the fixture on a machine table top. The feet 218a and 218b extend parallel to the width of the body, that is laterally, and provide various clamping locations in a machine tool or CMM. The feet extend beyond the top surface.

The fixture body 201 has a one piece design for a solid fixture used in repeatable setups. To form the three legs 219a, 219b, and 219c, two large swaths of material are removed by machine from the bottom of the fixture body 201 leaving the slots 217a, 217b between the bottom surfaces 215a, 215b, 215c. These slots 217a and 217b form radii 216a,216b,216c, and 216d remaining beneath the top 214 and they add support between the top 214 and the legs 219a, 219b, and 219c. The radii 216a,216b,216c, and 216d add strength and stiffness to the fixture body for repeatable clamping results allowing the top 214 to remain mutually parallel to the bottom surfaces 215a, 215b, and 215c of the legs for the design life of the body 201.

In the following description and in reference to the drawings, FIG. 15A, FIG. 16A, and FIG. 17A show the square test head or left head 202. Then FIG. 15B, FIG. 16B, and FIG. 17B show the round test head or right head 203.

FIG. 15A shows the left test head 202 for providing milling results from a CNC machine tool. A top 234 of the head is a planar surface. The top 234 of the left test head has four apertures as at 233a, 233b, 233c, and 233d. The test head has a square shape with four sides as at 232a, 232b, 232c, 232d, with two sides parallel to the feet 218a, 218b. The sides each have the same length and also define a width of the test head. Two of the sides are mutually parallel and spaced apart while the other two of the sides are mutually parallel and spaced apart but perpendicular to the first pair of sides. The sides, 232a, 232b, 232c, 232d, allow for milling tests to inspect a machine tool's accuracy of squareness, parallelism, and positioning. A common problem for machine tools occurs when one axis wears or fails resulting in machining different sizes from one axis to another. Sides 232a and 232c would commonly show results for the machine tool's "X axis" and sides 232b and 232d would commonly show results for the machine tool's "Y axis". After running an endmill around this test head in a mill test, a machine operator verifies the machine's squareness and parallelism with his micrometer. Furthermore, after a mill test, the sides 232a, 232b, 232c, 232d, are measured with the CMM to inspect squareness, parallelism, and positioning. Each pair of spaced apart sides has a spacing measured at two positions with a tolerance of 0.001 inch at a temperature of 68° F.

FIG. 15B shows a right test head 203 used for providing milling results from a machine tool. The top 262 of the head is a planar surface, round in shape with a circumference defining a perimeter. The top 244 of the right test head has four apertures 243a, 243b, 243c, 243d equiangularly spaced upon a common radius. Depending from the top 244 the along the circumference, the right test head 203 has a side 242, its round shape, with a diameter, concentric to the center. This surface 242, or side, permits milling tests to inspect a machine tool's accuracy of circularity and positioning. A common problem for machine tools occurs when one axis wears or fails resulting in mismatched machining marks on the surface 42 at 3 o'clock, 6 o'clock, 9 o'clock and 12 o'clock positions. After running an endmill around this right test head, a machine operator may run a position command via machine control to the center of the test head and verify the concentricity of the machine diameter with a test indicator. Furthermore, after a mill test on the surface 242, the machine tool test fixture is measured with the CMM to inspect circularity and positioning. In an alternate embodiment, the width of the left test head is proportional in size to the diameter of the right test head. In a further alternate embodiment the diameter of the right test head is the same as the width of the left test head. The sides allow for measurement at least at two positions of at least 44 degrees of angular rotation between the at least positions at a tolerance of 0.001 inch at a temperature of 68° F.

FIG. 16A is a front view of the left test head 202. This view shows a pair of apertures 274a and 274b, or outer apertures, extending partially into a bottom 250 of the test head. These apertures 274a and 274b have a shallow depth as shown. The bottom 250 of the left test head is flat and mates and then fastens to the top 214 of the fixture body 201. The bottom 250 sits flush upon the top surface of the fixture body 214. Inwardly from the apertures 74a and 74b, the bottom has additional apertures 273 that communicate through to apertures 233 as shown. These stepped apertures 273, 233, or inner apertures, allow an operator to fasten the head to the fixture body using mechanical fasteners. The inner apertures may have a step in their diameter as shown between aperture portion as at 233 and as at 273. The outer apertures 274a and 274b position the test head on the fixture body. The apertures 274a and 274b are blind holes whose depths do not exceed one-third of the test head's height as at 252. The depths of apertures 274a, 274b and 233 allow milling tests over the entire top 234 thus avoiding machining contact with fasteners and locating pins.

FIG. 16B is a front view of the right test head 203. This view similarly shows a pair of apertures 284a and 284b, or outer apertures, extending partially into, that is upward in the figure, a bottom 260 of the test head 203. The bottom 260 of the right test head is flat and mates and then fastens to the top 214 of the fixture body 201. The bottom 260 sits flush upon the top surface of the fixture body 214. Upon installation on the top surface, the bottom 260 of the right test head is coplanar with the bottom 260 of the left test head. Inwardly from the apertures 284a and 284b, stepped apertures 283 and 243 extend through the bottom and permit fastening the head to the fixture body. The inner apertures may have a step in their diameter as shown between aperture portion as at 283 and as at 243. The outer apertures 284a and 284b position the test head on the fixture body. Apertures 284a and 284b are blind holes which depths do not exceed more than one-third of the distance of the test head height as at 262. The depths of apertures 284a,284b, and 243 allow milling tests over the entire top surface 244 and avoid machining contact with fasteners and locating pins.

FIG. 17A is a bottom view of the left test head 202 showing its bottom surface 271. This view shows the centerline 270 of the test head with apertures, 273a, 273b, 273c, and 273d, arranged in the pattern as shown, and used for fastening to the fixture body. Apertures 273a, 273b, 273c, and 273d, or inner apertures, are shown in a pattern from the center 270 of the test head. The sized apertures 274a and 274b are parallel with the center 270 of the test head. The outer apertures 274a and 274b position the test head 202 on the fixture body and have a size within 0.001 inch, one thousandth of an inch, of a locating pin. This pattern of apertures 273a, 273b, 273c, 273d, 274a, and 274b matches the same pattern shown on the top of the fixture body 201 in FIG. 15A, thus the apertures of the left test head are in registration with the apertures of the body. The test head's four sides 272a, 272b, 272c, 272d are evenly spaced from the center 270 of the test head and with two sides parallel to the feet of the body.

FIG. 17B is a bottom view of the right test head showing the bottom surface 281. This view shows the centerline 280 of the test head with a pattern of apertures 283a, 283b, 283c, and 283d used for fastening to the fixture body. The apertures 283a, 283b, 283c, and 283d, or inner apertures, are shown in a pattern from the center 280 of the test head. The outer apertures 284a and 284b are parallel with the center 280 of the test head. The outer apertures 284a and 284b attach the test head to the fixture body and have a size within 0.001 inch, one thousandth of an inch, of the locating pin, not shown. This pattern of apertures 283a, 283b, 283c, 283d, 284a, and 284b matches the same pattern shown on the top of the fixture body 201 in FIG. 15B, thus the apertures of the right test head are in registration with the apertures of the body. The test head has a diameter as at 282, concentric to the center 280 of the test head. Though FIGS. 12-17B show patterns of four inner apertures, the Applicant foresees a minimum of at least three inner apertures as sufficient to secure a test head to the body.

The preceding figures show the machine tool test fixture and its various components. Because the machine tool test fixture is in the metrology field, the machine tool test fixture and its components have their own inherent accuracy. More particularly, the length and the width of the body, the width of the left test head, the diameter of the right test head, the positions of the first group of apertures, the positions of the second group of apertures, and any diameter meet a tolerance of no more than one thousandth of an inch and the measurements are taken at a temperature of sixty eight degrees Fahrenheit.

Figure 18:
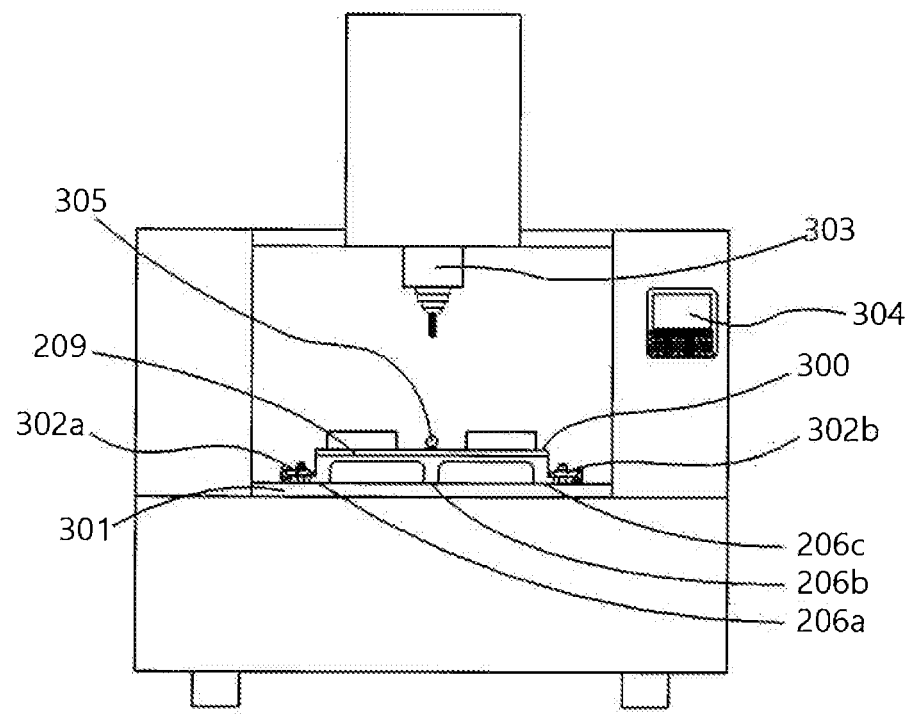
FIG. 18 is a front view of the test fixture installed in a CNC machine tool.

FIG. 18 is a front view of the machine tool test fixture 300 installed in a CNC machine tool. The test fixture assembly 300 is clamped down with fasteners 302a and 302b on the CNC machine tool table 301. Machine tools have many features. The machine tool has a table 301, a spindle 303, and a controller 304. The spindle receives a toolhead, a tool, a bit, a tip, or the like for machining, shaping, or otherwise manipulating a blank of material. The fixture body's bottom surface, as at 206a, 206b, 206c, is shown flat to the table 301. Fastening clamps 302a and 302b deploy on the outside feet 218a, 218b to secure the fixture to the machine table 301. The front witness cut 209 is shown to the front of the machine used to set the orientation of the fixture. One datum is shown with a construction ball 305 located in the center of the fixture body tooling hole 213. Using the controller 304, an operator positions the centerline of the spindle 303 to the centerline of the construction ball 305 to set digitally the origin of the work piece.

Figure 19:
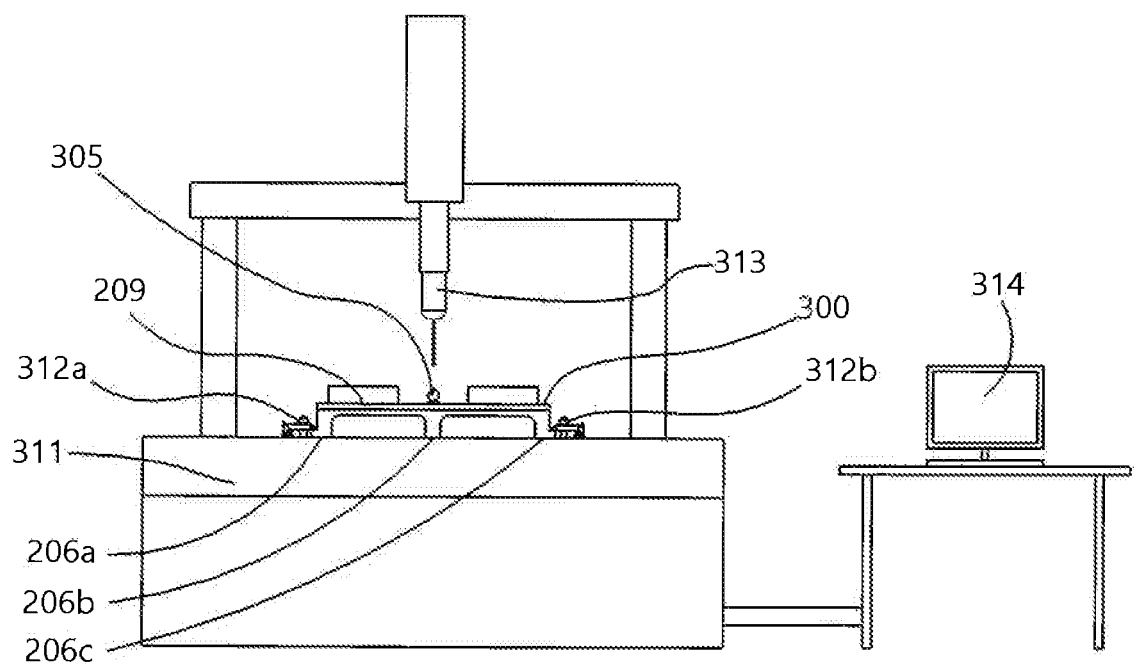
FIG. 19 is a front view of the test fixture installed in a CMM.

FIG. 19 is a front view of the machine tool test fixture 300 then installed in a CMM. The test fixture assembly 300 is clamped down with fasteners 312a and 312b on the CMM's granite table 311, one of the many features of a CMM. The measuring starts with a table 311, a probe 313, and a computer 314. The fixture body's bottom surfaces 206a, 206b, 206c are shown mutually parallel or flat to the table 311. Fastening clamps 312a and 312b deploy on the outside feet to secure the fixture to the machine table 311. The front witness cut 209 is shown to the front of the measuring machine used to set the orientation of the fixture. One datum appears with the construction ball 305 located in the center of the fixture body tooling hole 213. The probe 313 uses the construction ball 305 to set digitally the origin of the work piece. Measurements from inspected areas are read and recorded with a computer 314.

Figures 20, 21:
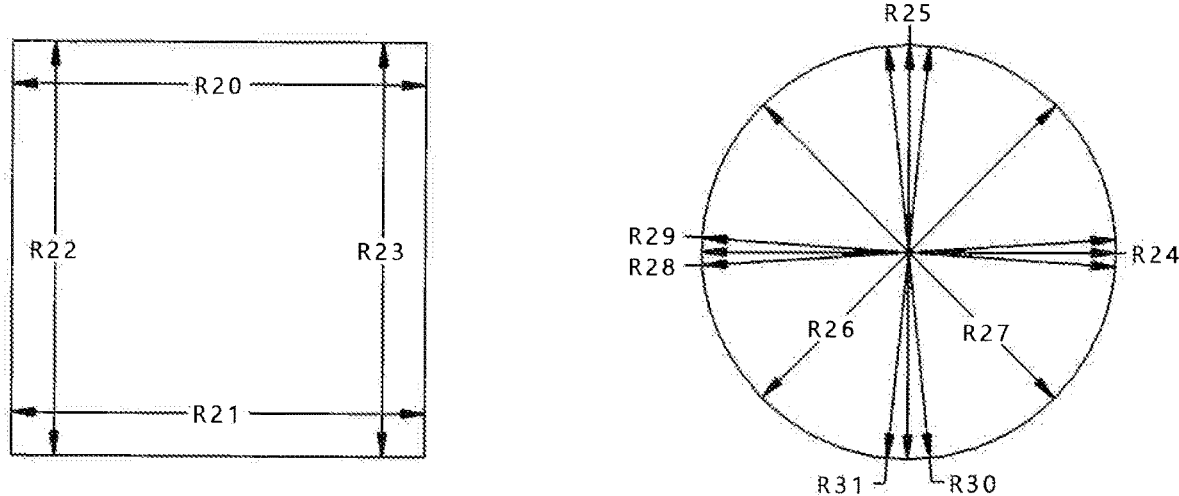
FIG. 20 is a top view of the test heads showing various measurements.
FIG. 21 is a table showing test results from using the test fixture.

FIG. 20 is the top view of the square test head as at 202 on the left and of the round test head as at 203 on the right. The values of the dimensions shown in R20 and R21 are used to represent parallelism of a machine tool. The values of the dimensions shown in R22 and R23 are also used to represent parallelism of a machine tool. Cross referencing values R20 and R21 against values R22 and R23 determines the squareness of a machine tool.

On the right test head 203, R26 and R27 values of the dimensions shown come from an orientation 90 degrees apart from each and relatively square to the front of the fixture. Values of the dimensions shown in R28, R29, R30, and R31 come from an orientation 90 degrees from each other and 45 degrees from the relative front of the fixture.

The R28, R29, R30, and R31 values are measured 1 degree of rotation off from values R24 and R25. These key values represent a machine tool's axis moving a positive value to a negative value and moving a negative value to a positive value. The amount of backlash within a machine tool's axis can significantly affect these values.

The values of the dimensions shown in R24, R25, R26, R27, R28, R29, R30, and R31 all represent the circularity of a machine tool. Out of tolerance machine tools may correctly qualify R24 and R25 values while failing to quality R26, R27, R28, R29, R30, and R31 values.

Machine tool axes can be compensated individually for out of tolerance positioning. But, compensating a machine tool's axis for the best results on a round geometric shape can distort the results on a square geometric shape. Likewise, compensating a machine tool's axis for the best results on a square geometric shape can distort the results on a round geometric shape. The combination of results from a square and a round geometric shape R20, R21, R22, R23, R24, R25, R26, R27, R28, R29, R30, and R31 provide the best values for compensating a machine tool's axis.

FIG. 21 displays a table with results from measurements taken from the dimensions shown in FIG. 20. The Target Dimension value is the size the machine tool is programmed to cut. The Target Dimension is the size the machine tool is trying to achieve. The Actual value is the measured size of the machine tool result. The Actual values for R20, R21, R22, and R23 in this example represent a machine tool squareness that is within 0.0003, three ten-thousandths of an inch. The Actual values R20, R21, R22, and R23 in this example represent the machine tool parallelism that is within 0.0000, an expected result. The Actual values R24, R25, R26, R27, R28, R29, R30, and R31 represent the machine tool circularity is within 0.0004, four ten-thousandths of an inch, an unexpected yet tolerable result. The machine tool axes can be compensated to achieve a better circularity result while maintaining a qualifying squareness result.

The On-Machine Inspection Indicator Setup Block, provides a repeatable way of measuring work piece surfaces on machine tools.

Figure 22A:
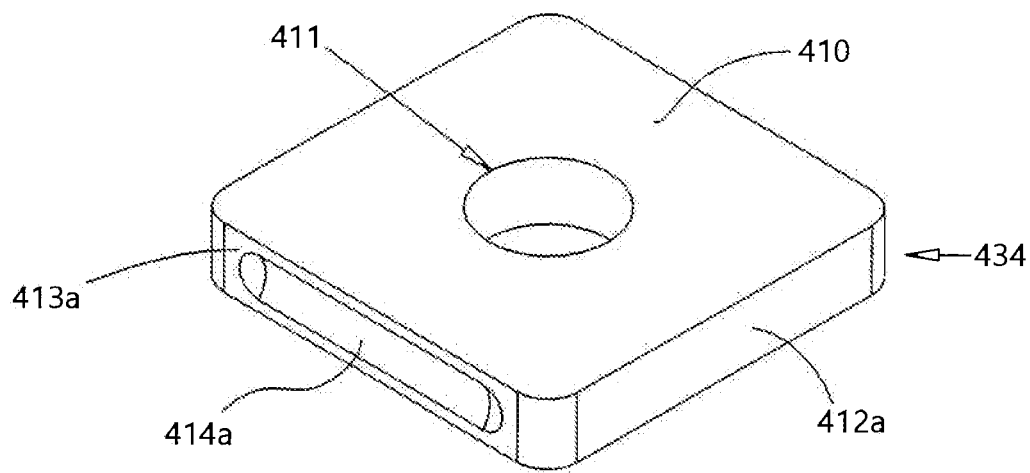
FIG. 22A is a top view of the alternate embodiment of the setup block.

FIG. 22A shows a top perspective view of the alternate embodiment of the on-machine inspection indicator setup block 434. The indicator setup block has a body here shown in isometric as a prismatic square with rounded corners. The device has a top surface 410 shown with a precision bore 411 located in the center. The precision bore 411, centered on the device, has a nominal size that communicates through the entire device. The precision bore 411 has a circularity less than 0.0001 in (one ten-thousandths of an inch) of total indicator readout. Rotating a test indicator from the precision bore's centerline at a complete revolution from zero to three hundred sixty degrees, the indicator reading must not deviate more than 0.0001 in (one-ten thousandths of an inch). The precision bore 411 is sized within 0.0002 in (two ten-thousandths of an inch) and has a surface finish of 32 RMS, root mean square of profile height deviation from the mean line, or better. This surface finish provides smooth uninterrupted test indicator measurements. The high tolerance of the precision bore 411 along with a smooth finish allows the test indicator to accurately transfer radial measurements from known machine tool positions. The precision bore 411 is perpendicular to the top surface 410. The top surface 410 has precision machining performed on it so the surface ensures the device rests flat during use. The top surface 410 has an orientation to the face of a machine tool spindle during use, as later shown in FIGS. 28-31a. Once a machinist verifies the top surface 410 surface as flat during use, the device ensures the precision bore 411 has a square orientation with a machine tool spindle. The device has a side 413a perpendicular to the top surface and spaced outwardly from the bore 411. The device's side 413a appears in the figure with an undercut 414a shown inwardly towards the bore 411. The undercut 414a assists a machinist in handling and removing the device from a planar surface. Perpendicular to the side 413a and the top surface 410, the device has its end 412a. The device has a non-magnetic metal construction.

Figure 23A:
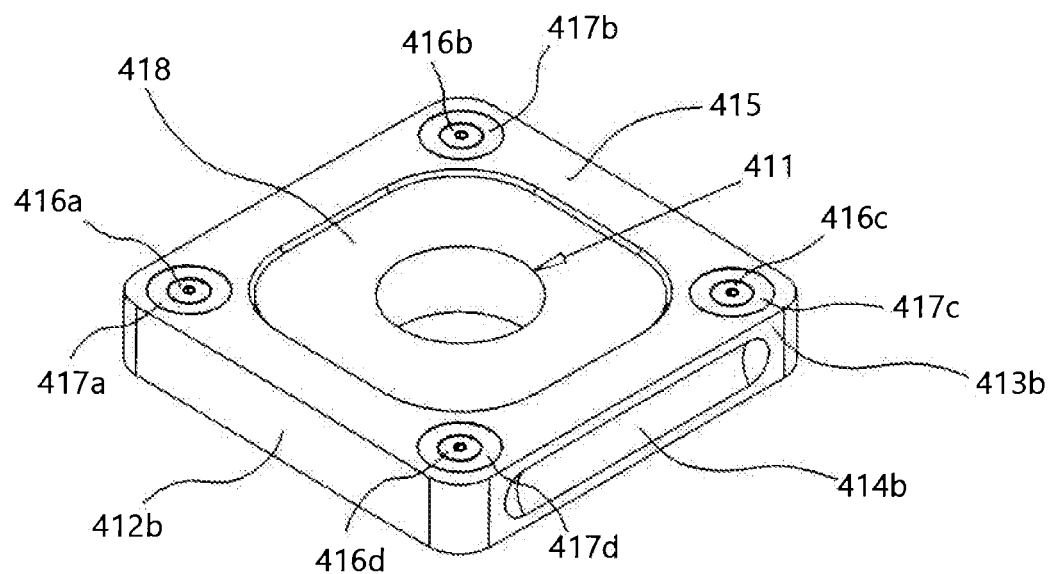
FIG. 23A is a bottom perspective view of the alternate embodiment.

FIG. 23A shows a perspective view of the alternate embodiment of the on-machine inspection indicator setup block opposite that of FIG. 22A. The device's bottom surface 415 appears as an isometric with the precision bore 411 positioned in the center. The bottom surface is planar and mutually parallel and opposite to the top surface 410, not shown. The bottom surface 415 has a centered relief area 418 as a recess into the bottom surface 415. This relief area 418 helps the device to rest flat on a planar surface. The relief area 418 lessens the amount of surface contact from the bottom surface 415 allowing for better setups by a machinist. The device has another side as at 413b here shown with another undercut, as at 414b. This other side 413b has a mutually parallel and spaced apart position from the side 413a previously shown. The undercut 414b serves as the second undercut on the device and has an opposite position from undercut 414a, 180 degrees from each other, as shown in FIG. 22A. Each side has an undercut. The undercut 414b travels the majority of the side 413b and has a smooth transition without sharp edges so that a machinist's fingers readily grasp the indicator setup block. Perpendicular to the side 413b, the device has its other end 412b. The end 412b has a mutually parallel and spaced apart position from the end 412a previously shown. The two sides 413 and the two ends 412 cooperatively define the rim of the indicator setup block. The device's bottom surface 415 has four magnetic inserts 417a, 417b, 417c, and 417d having an even spacing from each other. The magnetic inserts 417a, 417b, 417c, and 417d rest below the device's bottom surface 415 and fasteners 416a, 416b, 416c, and 416d respectively hold their inserts in place. The fasteners operate as a connector and preferably the fasteners are threaded bolts. The magnetic inserts 417a, 417b, 417c, and 417d rest below the bottom surface so the bottom surface 415 rests flat on a planar surface for optimum device performance.

Figure 24A:
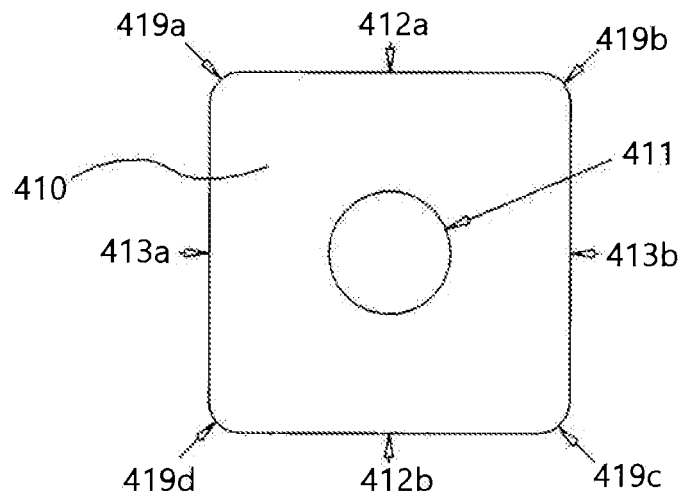
FIG. 24A is a top view of the alternate embodiment.

FIG. 24A is a top view of the alternate embodiment of the indicator setup block 434. The precision bore 411 has its centered position in the device as before. The top surface 410 is flat and planar that has a 32 RMS finish or better. This top surface indicates whether the device has a flat orientation before a machinist's use. The outside profile of the device, or rim, has the two ends 412a and 412b as well as the two sides 413a and 413b as previously described. The device's ends 412a and 412b are square to the device's sides 413a and 413b, that is perpendicular. The device has corners shown at 419a, 419b, 419c, and 419d where a side and an end merge and each corner has a radius which transition the device's ends 412a and 412b to the device's sides 413a and 413b. The corners 419a, 419b, 419c, and 419d have a convex shape providing a smooth feature with no sharp edges. These smooth features provide sharp free corners, comfortable for a machinist to handle.

Figure 25A:
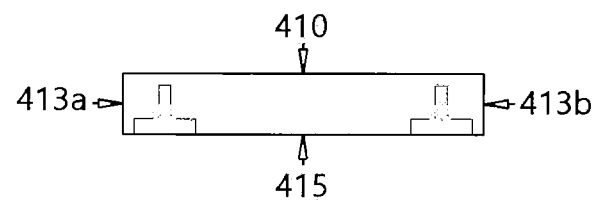
FIG. 25A is a front view of the alternate embodiment.

FIG. 25A is a front view of the alternate embodiment of the indicator setup block. The device's bottom surface 415 has its parallel orientation to the top surface 410. Both the top surface 410 and the bottom surface 415 are flat, planar surfaces. These surfaces have their parallel orientation within 0.0002 in (two ten-thousands and an inch), an accuracy beyond that shown in these drawings themselves. During use, the top surface 410 verifies that the device has a flat placement upon another planar surface. With the top surface parallel to another surface, the Applicant asserts that the bottom surface 415 has a flat orientation matching that of the top surface 410. This figure also shows the two mutually parallel and spaced apart sides 413a, 413b. This figure also shows in dotted line form the magnetic insert and fastener at each corner.

Figure 26A:
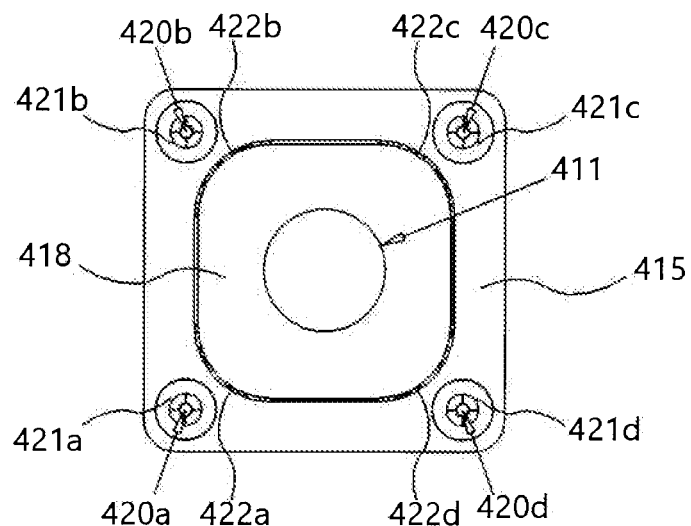
FIG. 26A is the bottom view of the alternate embodiment.

FIG. 26A shows a bottom view of the alternate embodiment of the indicator setup block. With a direct reverse image from the top view of FIG. 24A, the precision bore 411 has its position in the center of the device. In this view, the figure omits the magnetic inserts thus allowing the reader to see how the four pockets receive the inserts. The pockets 421a, 421b, 421c, and 421d have the form of blind apertures for the magnetic inserts. The pockets have a round shape and spacing evenly from each other. The pockets 421a, 421b, 421c, and 421d also have blind threaded apertures 420a, 420b, 420c, and 420d located in their centers. These threaded apertures 420a, 420b, 420c, and 420d receive cooperating threaded fasteners to retain the magnetic inserts in place. Preferably, the pockets have a symmetric arrangement about the center of the device. The relief area 418 represents a relatively thin amount of material removed from the device's bottom surface 415. The relief area consumes the majority of the center of the device's bottom surface leaving a profile of the bottom surface 415 around the outside of the device. The relief area 418 avoids interference between the pockets 421a, 421b, 421c and 421d and the relief area's radii as at 422a, 422b, 422c, and 422d. The radii 422a, 422b, 422c, and 422d allow for a larger relief area 418 without interfering with the pockets 421a, 421b, 421c, and 421d.

Figure 22B:
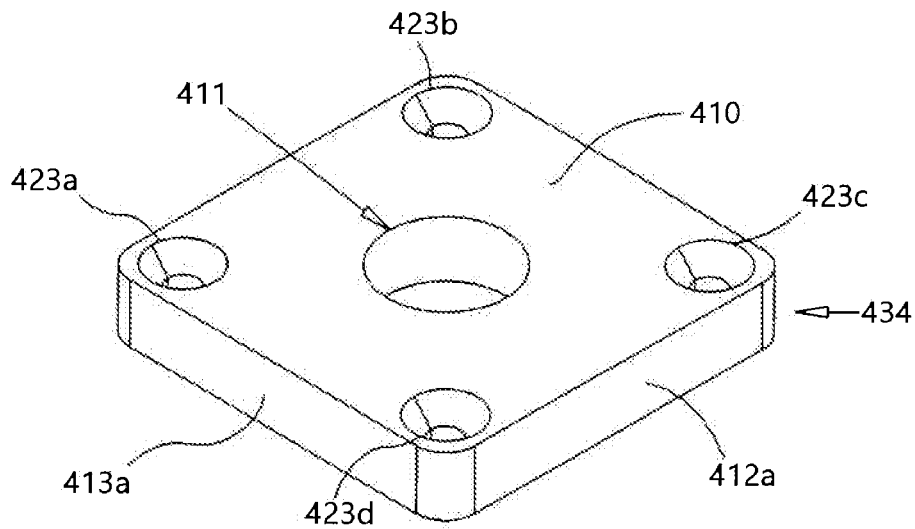
FIG. 22B is a top view of a preferred embodiment of the setup block.

FIG. 22B shows a perspective view of the preferred embodiment of the indicator setup block using threaded fasteners as later shown. This embodiment has similar form as the alternate embodiment with a body 434 having a top surface 410, the centered precision bore 411, an end 412a, and a side 413a. The precision bore 411 has its nominal size aperture communicating through the device as before. The precision bore 411 has a size to within 0.0002 in (two ten-thousandths of an inch) and has a surface finish of 32 RMS or better. The precision bore 411 is perpendicular to the top surface 410. The top surface 410 has precision machining as before for its use to ensure the device rests flat when oriented to the face of a machine tool spindle during use. Unlike the preferred embodiment, this side 413a does not have an undercut. Perpendicular to the side 413b, the device has its other end 412b. The end 412b has a mutually parallel and spaced apart position from the end 412a previously shown. The two sides 413 and the two ends 412 cooperatively define the rim of the indicator setup block. Preferably, the ends and the sides each have the same length. The top surface 410 has corners where the ends 412a, 412b and the sides 413a, 413b meet. Proximate each corner, the top surface has a countersunk threaded aperture as at 423a, 423b, 423c, 423d. The apertures 423a, 423b, 23c, 23d communicate to the bottom surface. The device has a non-magnetic construction as before.

Figure 23B:
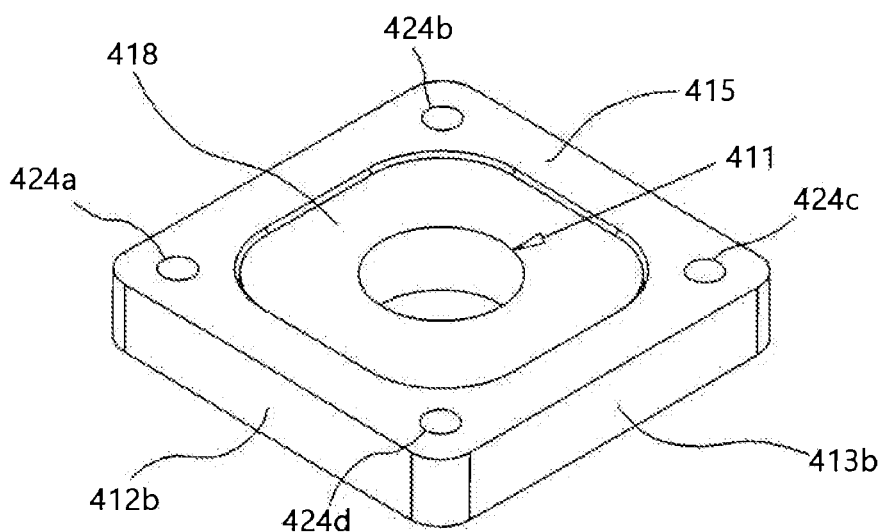
FIG. 23B is a bottom perspective view of the preferred embodiment.

FIG. 23B describes a bottom perspective view of the preferred embodiment opposite FIG. 22B. The device's bottom surface 415 has the centered precision bore 411 in the centered relief 418 area recessed into the bottom surface. This relief area has its purpose of before to assist the device in resting flat on a planar surface. The device has another side 413b and another end 412a shown. The side and the end in this figure have a mutually parallel and spaced apart orientation to the side and the end of FIG. 22B. The other side 413b omits an undercut compared to the preferred embodiment. The apertures from the top surface open to the bottom surface 415 proximate the corners showing their exits as at 424a, 424b, 424c, 424d. The exits have a round shape of lesser diameter than the countersink shown in FIG. 22B. The exits 424 cooperate with the bottom surface 415 so that the device rests flat on another planar surface.

Figure 24B:
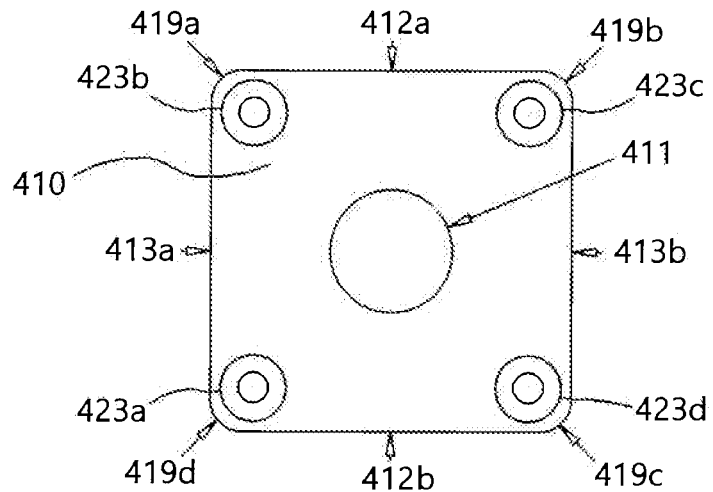
FIG. 24B is a top view of the preferred embodiment.

FIG. 24B is the top view of the preferred embodiment of the indicator setup block 434. The precision bore 411 has its centered position in the top surface 410 where that is flat and planar with a 32 RMS finish or better. This top surface has usage to indicate whether the device has a flat orientation before a machinist's use. The outside profile of the device has two ends 412a and 412b as well as two sides 413a and 413b. The device's ends 412a and 412b have a square orientation to the device's sides 413a and 413b. The device's corners as at 419a, 419b, 419c, and 419d each have a radius which transition the device's ends 412a and 412b to the device's sides 413a and 413b as shown. The corners 419a, 419b, 419c, and 419d have a convex shape providing no sharp edges thus making the corners smooth and comfortable for manual handling. Each corner shows a cooperating aperture 423a, 423b, 423c, 423d.

Figure 25B:
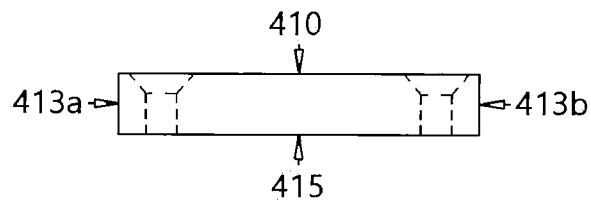
FIG. 25B is a front view of the preferred embodiment.

FIG. 25B is the front view of the preferred embodiment. The device's bottom surface 415 has its parallel orientation to the device's top surface 410 as before and both surfaces 410, 415 are flat thus providing parallel within 0.0002 in (two ten-thousands and an inch). During use, the top surface 410 verifies that the device has a flat placement upon another planar surface. With the top surface parallel to another surface, the Applicant asserts that the bottom surface 415 has a flat orientation matching that of the top surface 410. This figure also shows the two mutually parallel and spaced apart sides 413a, 413b. This figure also shows in dotted line form two apertures and their cooperating exits.

Figure 26B:
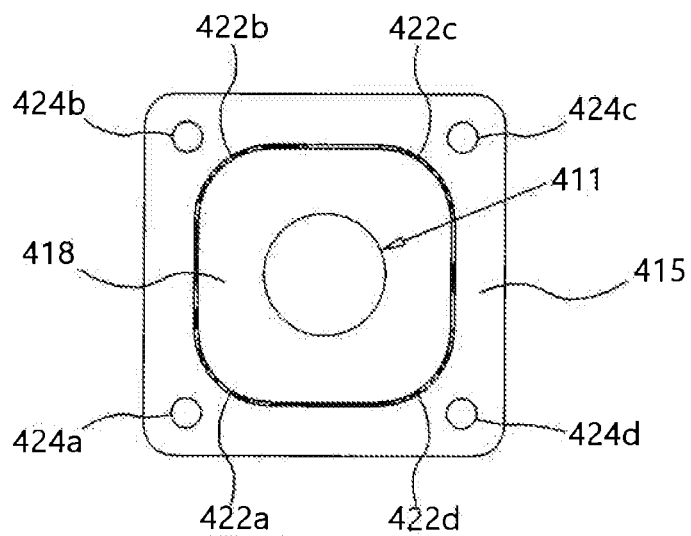
FIG. 26B is the bottom view of the preferred embodiment.

FIG. 26B illustrates a bottom view of the preferred embodiment. With a direct reverse image from the top view of FIG. 24B, the precision bore 411 has its centered position as before. The bottom surface shows the four exits 424a, 424b, 424c, 424d proximate their respective corners. Each exit communicates to a countersunk aperture into the plane of this figures. These countersunk apertures receive cooperating threaded fasteners as later shown. Preferably, the exits, and their cooperating apertures have a symmetric arrangement about the center of the device. The relief area 418 represents a relatively thin amount of material removed from the device's bottom surface 415 and leaves a profile of the bottom surface 415 around the outside of the device. The relief area 418 avoids interference between the exits 424a, 424b, 424c, 424d and the relief area's radii as at 422a, 422b, 422c, and 422d. The radii allow for a larger relief area 418 without interfering with the countersunk apertures and their cooperating exits.

Figure 27A:
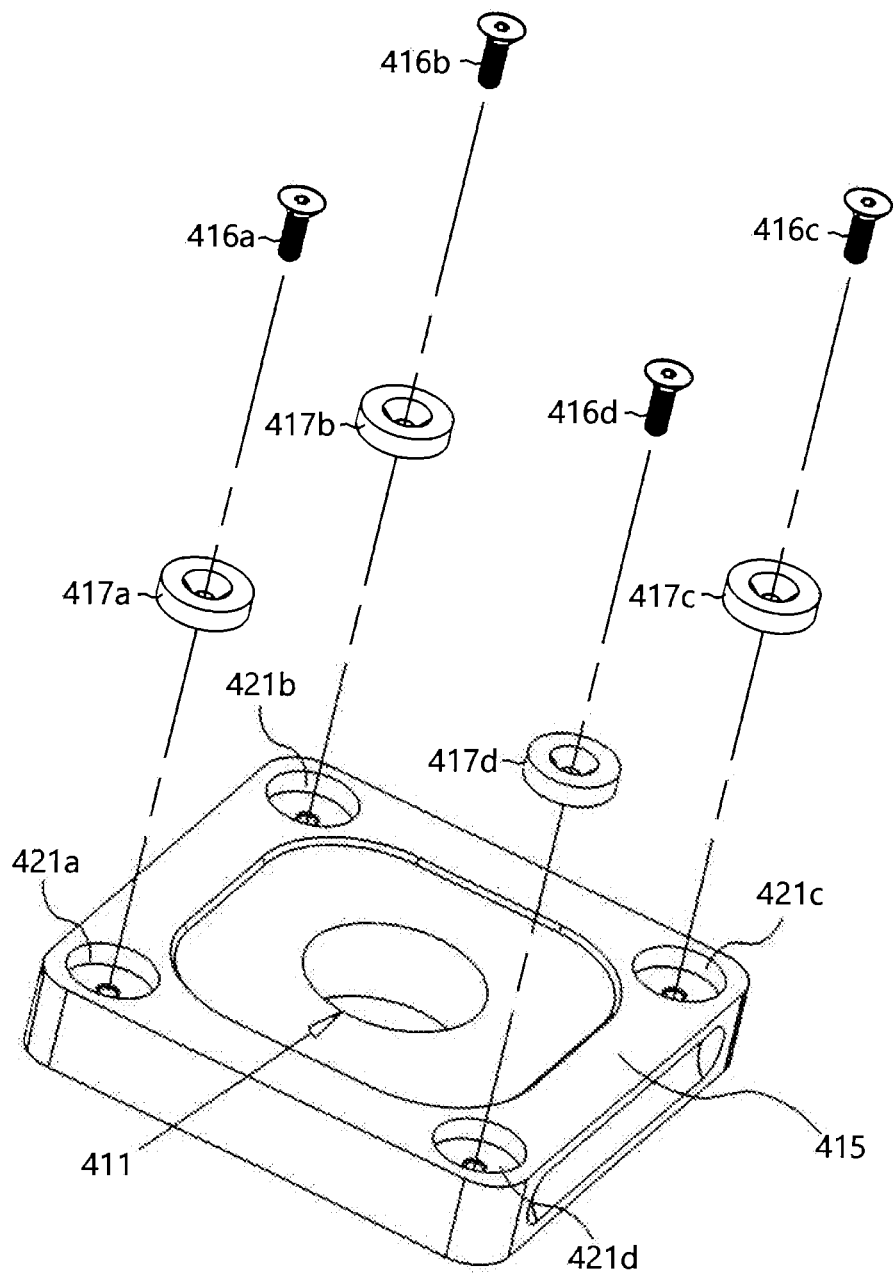
FIG. 27A is a bottom exploded perspective view of the alternate embodiment.

FIG. 27A is a perspective bottom exploded view of the alternate embodiment of the indicator setup block prepared for installation. This view shows the magnetic inserts 417a, 417b, 417c, and 417d for installation with the fasteners 416a, 416b, 416c, and 416d, where the fasteners are connectors and alternatively bolts, into the pockets 421a, 421b, 421c, and 421d respectively. The device's bottom surface 415 shows the four pockets 421a, 421b, 421c, and 421d that have more depth than the thickness of the magnetic inserts 417a, 417b, 417c, and 417d as well as a slightly larger diameter. These larger sizes allow for the magnetic inserts 417a, 417b, 417c, and 417d to slip fit into the device's pockets, 421a, 421b, 421c, and 421d, resting below the bottom surface 415. These close tolerance fits prevent dirt and debris from accumulating and preventing the bottom surface 415 from resting flat during use. The depth of each pocket, 421a, 421b, 421c, and 421d, is slightly deeper than the thickness of the magnetic inserts 417a, 417b, 417c, and 417d and thus allows the device to attract to magnetic planar surfaces while maintaining a flat setup. The magnetic inserts 417a, 417b, 417c, and 417d have countersinks to accept shallow fastener heads and thus maintain magnetic attraction.

Figure 27B:
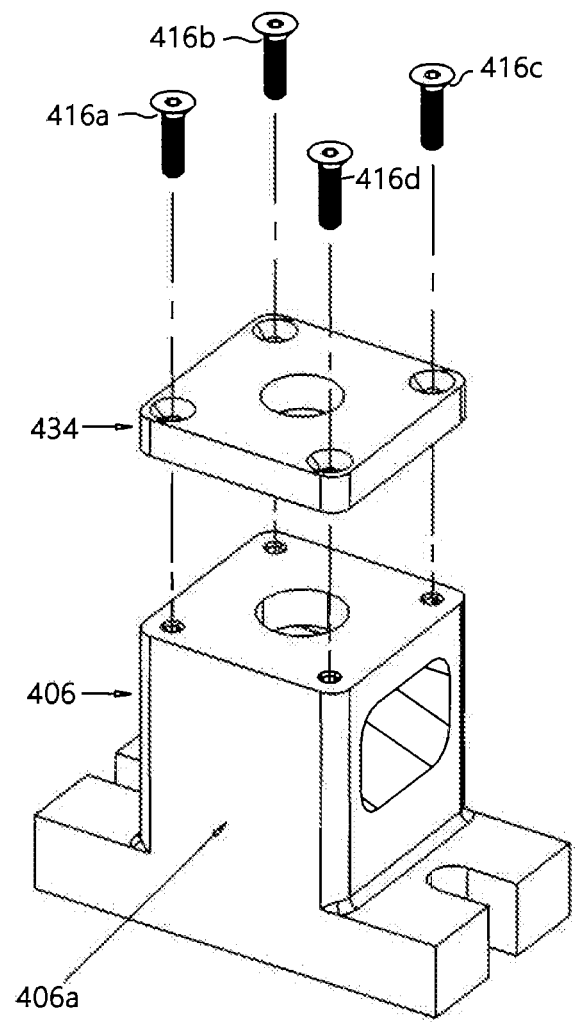
FIG. 27B is a perspective view of the preferred embodiment in usage.

FIG. 27B shows a perspective exploded view of the preferred embodiment in usage. Here, the device 434 has its planar form with the top surface spaced above the bottom surface by the thickness shown at the end and the side. The device has its countersunk apertures proximate the corners that receive the fasteners 416a, 416b, 416c, and 416d. Each fastener has a length that extends through the countersunk aperture 423 and from the exit 424. The fasteners then approach a base 406 that has an upright elongated body 406a with two opposite outwardly extending feet. The fasteners secure into threaded apertures in the top of the base as later explained.

FIG. 27C provides a top view of the preferred embodiment with the base 406 ready to accept the indicator setup block 434. The base 406 has it generally square body 406a here shown on end with its own top surface 472 shown in the foreground. This top surface 472 is flat, planar, and machined to 32 RMS as the top surface 411 of the indicator setup block. This top surface 472 includes a bore 411 into the body 6a. The bore extends partially into the body as later shown. This top surface 472 has four threaded apertures 467a, 467b, 467c, 467d evenly spaced and oriented to the corners of the body as shown. These four threaded apertures register with the exits 424a, 424b, 424c, 424d of the bottom surface 415. These four threaded apertures also receive the fasteners 416a, 416b, 416c, 416d extending from the exits of the bottom surface 415. Outwardly from each threaded aperture, this top surface 472 has a rounded corner, collectively shown as 470a, 470b, 470c, 470d. In the left of the figure, the two corners of the body round down, that is, into the plane to a left face 468 of the body 406a. In the right of the figure, the two corners of the body round down, that is, into the plane to a right face 469 of the body 406a. From the left of the figure, the base 406 has its first foot 462 into the plane of this figure. The first foot extends to the left of the body 406a from the left face 468 at a length less than half the width of the body. The first foot has its own width similar to that of the width of the body. Generally centered upon the first foot and collinear with the bore 411, the first foot has a slot formed of two spaced apart walls 465a, 465b joining to a rounded end 465c. The slot extends for the depth of the first foot but has a length less than that of the first foots. The spaced apart walls have a sufficient space to admit a component of a clamp.

The first foot has a front face 461, here shown towards the bottom, and a mutually parallel and spaced apart rear face 463. The front face and the rear face have a parallel orientation to the slot on the left and a perpendicular orientation to the height of the body 406a.

The front face and the rear face both extend to the right in this figure past the body 406a from the right face 469 and to a second foot 464. The second foot is symmetric to the left foot. The second foot also has a slot formed of two spaced apart walls 465a, 465b joining to a rounded end 465c as well. The slot extends for the depth of the second foot but has a length less than that of the second foot. The spaced apart walls have a sufficient space to admit a component of a clamp, similar to the first foot.

Turning the base ninety degrees on two axes, FIG. 27D provides a side view of the body 406a with the left face 468 shown above the first foot 462. The first foot extends upwardly from a second bottom surface 473 and has its slot generally centered with the end 465c on dead center. The body 406a extends above the first foot 462 with the rear face 463 here shown to the left and the front face 461 oppositely here shown to the right. The top surface 472 spans from the front face to the rear face and generally parallel to the left foot. Towards the center, the left face 468 has a chamber 478 formed therein of a prismatic sloped rectangular form. The chamber forms from four spaced apart rounded corners 478a, 478b, 478c, 478d extending into the body 406a. Between the two lower corners, the chamber has a sloped ramp 477a extending upwardly, that is, away from the first foot, and inwardly into the body 406a. The ramp has a generally flat surface from side to side between the two lower corners, 478b, 478d as shown.

Rotating the body 406a clockwise ninety degrees, FIG. 27E describes a front view of the preferred embodiment. The base 406 has its second bottom surface 473 as before and this figure shows the first foot 462 to the left and the second foot 464 to the right. Opposite the second bottom surface the first foot and the second foot both have an instep 474, generally a flat surface spaced above the second bottom for the thickness of the feet. The insteps merge to the left face 468 and the right face 469 with a rounded corner as at 475. Above the feet, the body 406a has the chamber 478 extending into it, here shown on the side. The chamber has its sloped ramp 477a toward the left and rising upwardly into the body to about the midpoint. The chamber then has a reverse sloped ramp 477b toward the right and declining form the peak of ramp 477a. The reverse sloped ramp 477b is a mirror image of ramp 477a. Spaced above the ramps 477a, 477b, the chamber 478 has a roof 476. The roof has a generally flat surface parallel to the second bottom. The roof extends across the length of the body and for the width of the chamber. The roof also receives the bore 411 in communication. The bore presents a perimeter wall 471 into the top surface 472 of the body. The bore receives an indicator, or other tool, not shown, and any shaving, oils, debris, and waste during usage. The debris falls through the bore and enters the chamber. Under gravity, the debris falls through the chamber and lands upon sloped ramp 477a and reverse sloped ramp 477b. The two ramps have an angle upwardly from the plane of the second bottom surface. The angle presents a surface where the gravitational pull overcomes the friction of the debris to the body. Thus, the debris gently slides out of the chamber thus leaving the bore clear of debris. The angle of the ramps has a proportion to the highest coefficient of friction of debris related to the material of the body 406a.

Rotating the body once more ninety degrees, FIG. 27F shows a side view opposite that of FIG. 27D of the preferred embodiment of the body 406a with the right face 469 shown above the second foot 464. The second foot extends upwardly from the second bottom surface 473 with its slot generally centered with the end 465c on dead center. The body 406a extends above the second foot 464 with the front face 461 here shown to the left and the rear face 463 oppositely here shown to the right. The top surface 472 spans from the front face to the rear face as before and generally parallel to the left foot. Towards the center, the right face 469 has the chamber 478 formed therein of a prismatic sloped rectangular form from its four spaced apart rounded corners 478a, 478b, 478c, 478d extending into the body 406a. Between the two lower corners, the chamber has a reversed sloped ramp 477b extending upwardly, that is, away from the second foot, and inwardly into the body 406a. The reversed slope ramp has a generally flat surface from side to side between the two lower corners, 478b, 478d as shown.

FIG. 27G is a top view of the alternate embodiment of the body ready to receive the magnetic style of the device. This figure is similar to FIG. 27C except for the top surface 72. In this embodiment, the top surface is flat and planer to the 0.0002 in tolerance as described above. The top surface also has magnetic material therein that attracts the magnetic inserts previously shown, as in FIG. 27A. The top surface has its bore 411 with a perimeter wall 471 into the body 406a. in usage;

FIG. 27H provides a side view the alternate embodiment of the preferred embodiment of the base 406, more particularly of the body 406a with the left face 468 shown above the first foot 462. FIG. 27H is similar to FIG. 27D and the description above is incorporated by reference.

FIG. 27I illustrates a front view of the alternate embodiment of the preferred embodiment of the base 406. The base 406 has its second bottom surface 473 as before and this figure shows the first foot 462 to the left and the second foot 464 to the right. This figure also shows the chamber 478. FIG. 27I is similar to FIG. 27E and the description above is incorporated by reference.

FIG. 27J shows a side view opposite that of FIG. 27H of the alternate embodiment of the body 406a with the right face 469 shown above the second foot 464. This figure also shows the chamber 478 with the reverse slope ramp 477b. FIG. 27J is similar to FIG. 27H and the description above is incorporated by reference.

Figure 28:
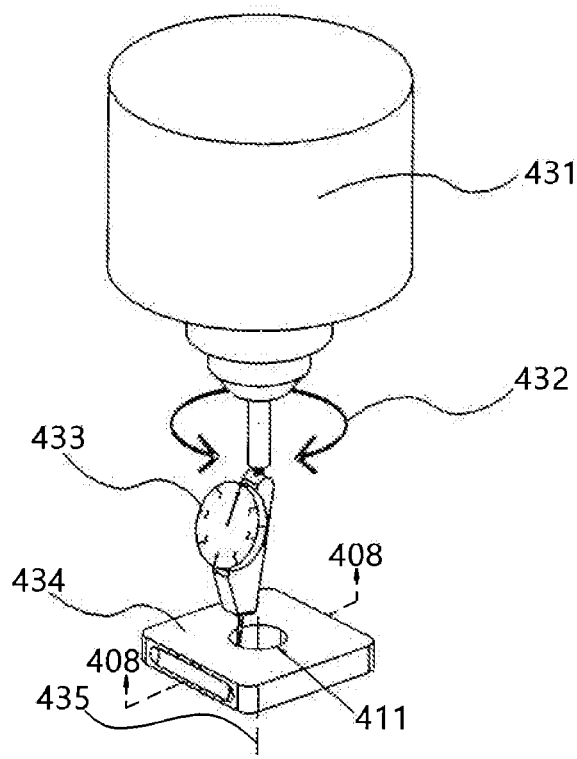
FIG. 28 is perspective view of the setup block in usage.

FIG. 28 shows a perspective view of how the device 434 used with a spindle 431 of a machine tool. The device's precision bore's 411 centerline, as at 435, aligns with the machine tool's spindle 431 with its test indicator 433 also on the same centerline. The spindle 431 slowly rotates to find this centerline 435. Once the centerline of the spindle aligns with the device's center 435, the test indicator 433 will display the same reading during rotation shown as at 432. The rotation 432 direction of the spindle 431 turns in either a clockwise or a counterclockwise direction. The spindle 431 with the indicator 433 references the device's precision bore 411. The sectional view in FIG. 29 is referenced in FIG. 28 at 408.

Figure 29:
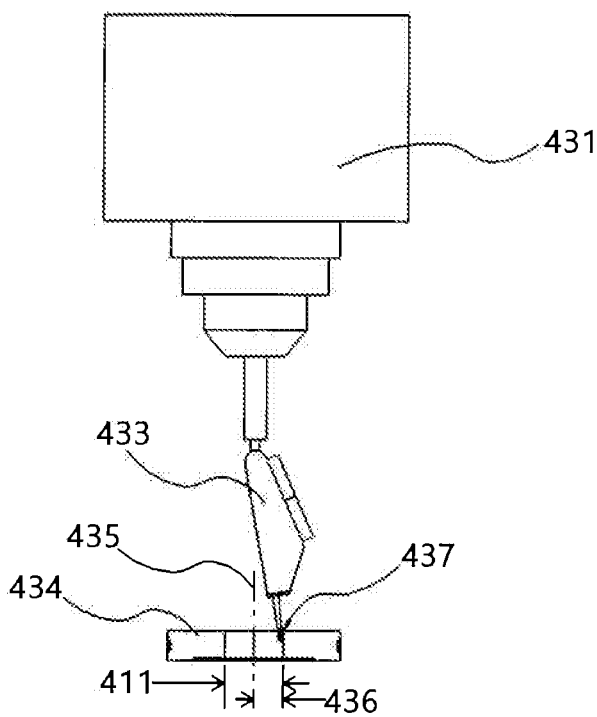
FIG. 29 is a side view of the setup block in usage.

FIG. 29 shows a side sectional view of the device 434 that receives a spindle 431 of a machine tool. The spindle 431 aligns with the same centerline as the device's precision bore's centerline, as at 435. The test indicator 433 has its point of contact 437, as it is loaded, against the device's precision bore 411. As the test indicator 433 receives its load, the distance between the point of contact 437 and the spindle centerline now equals one half of the value of the diameter of the precision bore 411. This known value, as at 436, then sees use as an offset to measure surfaces at a radial distance from the spindle 431.

FIG. 30 shows a front view of the device 434 installed and setup in a machine tool 441. The device 434 rests flat on a work piece 443. The spindle 431 then aligns to the same centerline as the device's precision bore's centerline 435. The test indicator 433 then has its loaded point of contact 437 against the device's precision bore 411. The spindle 431 follows the centerline of the device's precision bore 411. As the test indicator 433 has its load increase, the distance between the point of contact 437 and the spindle centerline now equals one half of the value of the precision bore 411. The machine tool digital readout 442 then records and stores the current machine coordinates of the device 434. In this figure, the test indicator 433 had its load at a radial value displaying the same indicator reading as it rotates around the centerline of the device 434.

FIG. 30a is an enlarged detail view of FIG. 30. This figure shows the spindle 431 in close contact to the device 434 upon the wall of the bore 411. The device rests upon a work piece wherein the top surface of the device reflects the degree of flatness of the work piece. Preferably, the top surface of the device has a parallel orientation, within tolerance, to the work piece's top surface.

FIG. 31 shows a front view of the machine tool 441 using the setting that the device 434 has captured. This figure shows how the spindle 431, indicator 433, and the digital readout 442 cooperatively measure the work piece 443. Once the spindle 431 and test indicator 433 become aligned, previously shown in FIG. 30, this known radial value 436, or offset, qualifies surfaces on work pieces. Using the machine tool's digital readout 442 the centerline 444 of the machine tool's spindle 431 then has an offset of one half of the value of the device's precision bore 411 to measure the periphery of the work piece 443. This measurement occurs using the test indicator 433 at the highest point of contact 437 as it carries its load against the work piece 443. In this figure, the radial measurement 436 only appears when the indicator 433 reaches its highest peak at the point of contact 437 with the work piece 443.

FIG. 31a provides an enlarged detail view of FIG. 31. This figure illustrates the work piece having a shift to the right, compared to FIG. 30a. The shift to the right results in the work piece having a position away from the centerline 435 measured by the offset 436.

FIG. 32 has a top view of a work piece surface to verify the indicator setup block. The work piece surface has a generally rectangular shape as shown where surface has dimensions of approximately 40 in. by 24 in. The 40 in dimension represents the longitudinal sides of the work piece, that is, the length. The 24 in dimension represents the lateral side of the work piece, that is, the width and the lateral sides are perpendicular to the longitudinal sides. Centered in the work piece, this surface has a target origin shown as the cross hairs having the 0 indicia. Outwardly slightly from the lateral sides along a line bisecting the width of the work piece, the indicator setup block cooperates in taking measurements at points R120 and R121 as shown. Upwardly and downwardly slightly from the longitudinal sides along a line bisecting the length of the work piece, the indicator setup block cooperates in taking measurements at points R122 and R123 as shown.

FIG. 33 describes a table of results from verifying the indicator setup block. A machinist places the indicator setup block upon the origin of the work piece as shown in FIGS. 30, 31. The machinist then measures from the bore 411 to the lateral target points R120, R121 of FIG. 32. These measurements yield the table data for R120, R121 about the spindle centerline position, the surface target size, the indicator reading at each point, the actual surface dimension, and the combined overall size from the summation of the average true range of the two actual surface readings. This actual overall size shows the actual length of the work piece.

Similarly, the machinist then measures from the bore 411 to the longitudinal target points R122, R123 of FIG. 32. These measurements yield the table data for R122, R123 about the spindle centerline position, the surface target size, the indicator reading at each point, the actual surface dimension, and the combined overall size from the summation of the average true range of the two actual surface readings. This actual overall size shows the actual width of the work piece.

Figure 34:
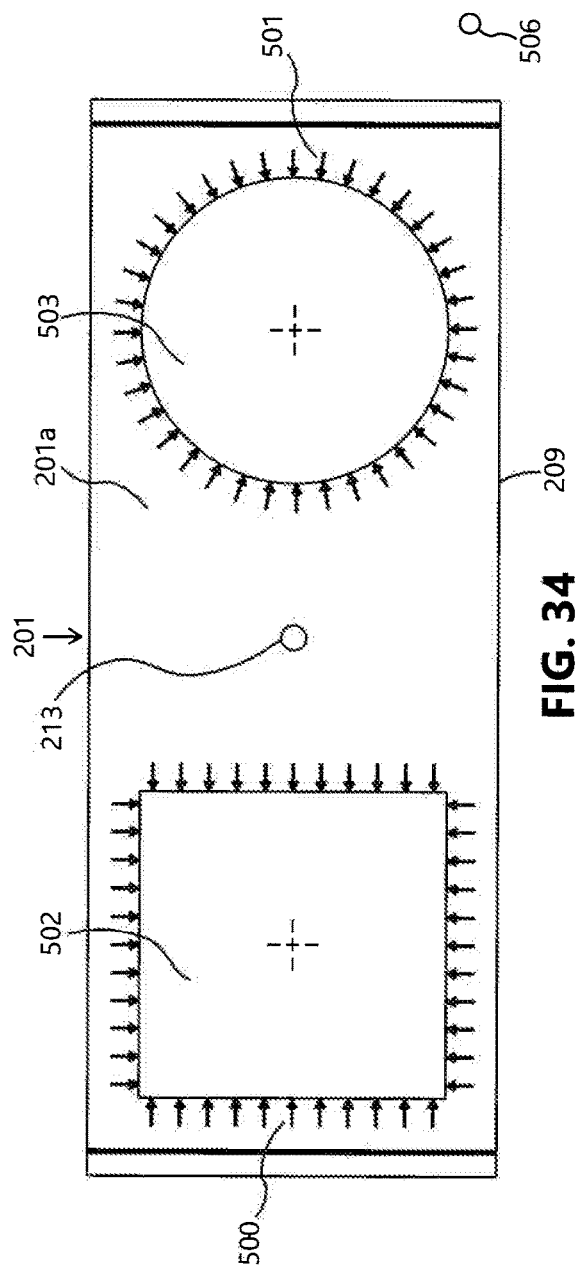
FIG. 34 is a top view of the method showing the direction of a probing program.

FIG. 34 is the top view of the machine tool test fixture 201 with a square shaped test head 502 and cylindrical test head 503. Test heads 502 and 503, or test pieces, are precision machined with the use of a surface grinder or that of a qualified milling machine. These test heads 502 and 503, or test pieces, are understood to be known prequalified sizes. These prequalified test pieces are used to verify a machine tool's probe performance by measurement to known surfaces. A round shaped probe 506 completes the shown program directions. Probing, or measuring, is also referred to as taking measurements, hits, or beeps. The arrows 500 and 501 display the program direction of the probe on a CNC or a CMM. The program is executed by probing with a direction of 90 degrees to the surface normal of each test head. Arrows 500 display the probe direction is square to each respective side on a precision square test head. Arrows 501 display probe direction is normal to the precision round test head surface. Therefor the probe program on a cylindrical test head the arrows 501, or program, all point to the direction of the center of the cylinder. These probing results are then verified for squareness, parallelism, positioning, and circularity as shown in FIG. 20.

The setup of the workpiece is defined by a plane 550, orientation 551, and origin 552. The plane 550 is defined by using the top surface 201a. By ensuring the surface is flat and by building a construction plane off of this surface the plane 550 is established. The orientation is defined by using the front witness edge 209. This orientation 551 is defined by using the full travel amount across the entire fixture. The origin 552 is defined by the center datum hole 213. By using only one datum point 213 or origin prevents error when comparing machine tools to each other.

Defining the plane 550, orientation 551, and origin 552 is the groundwork for examining a machine tool. Defining the plane 550, orientation 551, and origin 552 establishes a part setup. These key setup points will remain constant throughout each individual setup on different machine tools. By establishing this solid work coordinate system setup errors no longer influence testing results. The plane 550 is defined by taking a minimum of three points of measurement. The orientation 551 is defined by taking two points of measurement. The origin 552 is defined by 1 point of measurement.

Figure 35:
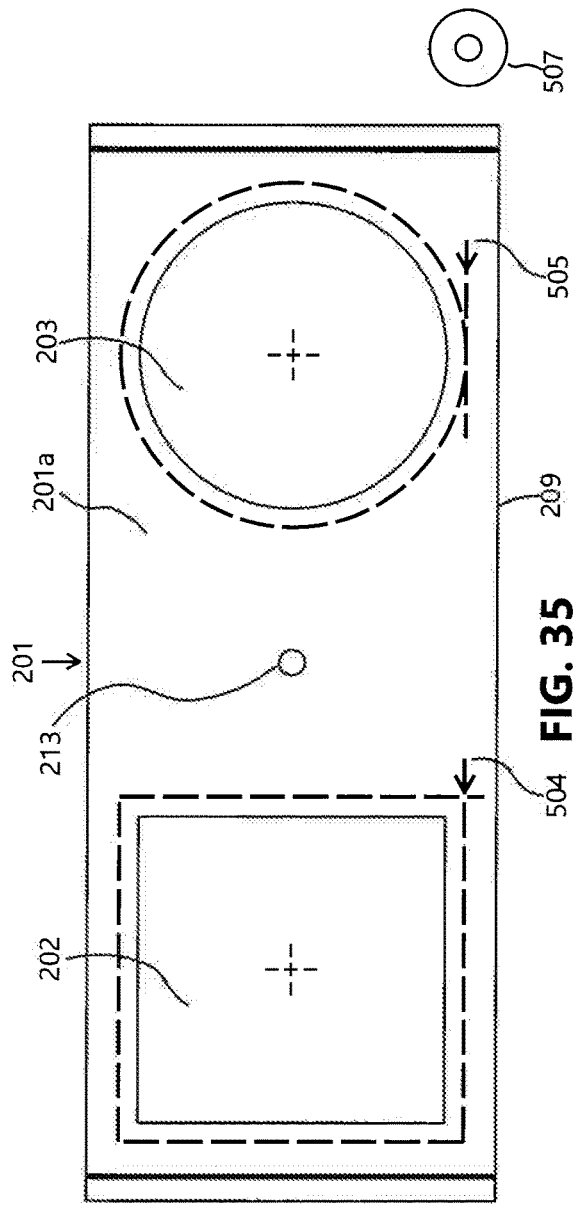
FIG. 35 is a top view of the method showing the centerline of a toolpath; and,
FIG. 36 is a block diagram displaying part setup instructions on a machine tool.

FIG. 35 is the top view of the machine tool test fixture 201 with a square test head 202 and cylindrical test head 203, or test pieces. The plane 550, orientation 551, and origin 552 setup in FIG. 35 is the same as FIG. 34. The centerline with arrows 504 and 505 displays the cutting toolpath used to examine a machine tool. A cutting tool 507 profiles around the outside of each test piece feature. This cutting tool is profiled at a radial offset distance from the target feature or test piece. These cutting results are then verified and compared for squareness, parallelism, positioning, and circularity as shown in FIG. 20.

Figure 36:
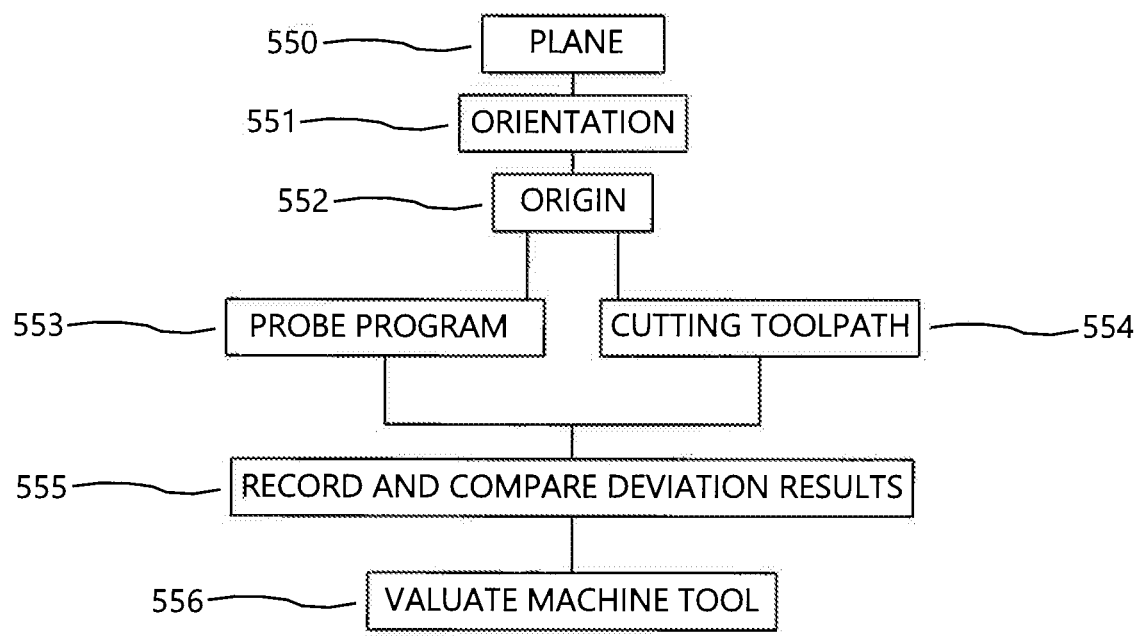

FIG. 36 is a block diagram that defines the core of the machine tool setup process. The plane 550 on the machine tool fixture is defined by the top surface of the machine tool test fixture. This plane 550 is often a fixed setting with the machine table serving as the base plane. The orientation 551 on the machine is defined by taking two points off of a linear point of contact. Orientation 551 on the machine tool test fixture is defined by the witnessed front edge. The origin 552 of the machine tool is a point at which the datum is created. The machine tool test fixture has one datum hole to define this point. By defining the plane 550, orientation 551, and origin 552 probe programs 553 and cutting toolpaths 554 are executed at their highest consistency, repeatability, and accuracy. After the probe program 553 or cutting toolpath 554 has been performed the deviation of results 555 are recorded and examined. The machine results 555 are compared to the target measurements. One way to compare results is done by reviewing the measurement results based on original machine specifications. Valuating 556, or qualifying the machine tool's worth is based on the deviation of results. The smaller the deviation from the target measurements identifies a higher machine tool's value. The smallest deviation from the target measurements defines a higher value in the marketplace. The larger the deviation result from target measurements identifies a lower value machine tool.

A method of valuing a machine tool with the method comprises of defining a plane within a machine tool. The method comprises of defining an orientation within a machine tool. The method comprises of defining an origin within a machine tool. The method comprises of probing, or measuring, a prequalified test piece. The method comprises of recording probing, or measurement, results. The method comprises of cutting a test piece within a machine tool. The method comprises of measuring the cutting results. The method comprises of recording the cutting results. The method comprises of recording the deviation from a set of target dimensions. The method comprises of comparing the deviation results to standards. The method comprises of valuating, or qualifying the machine tool.

A method of measuring a surface within a machine tool comprising of providing a preferred indicator setup block. The method comprises of mounting an indicator in a machine tool spindle. The method comprises of locating the centerline of the setup block. The method comprises of loading the indicator to the surface of the precision bore. The method comprises of setting indicator on a dial to set position. The method comprises of rotating the spindle to confirm the centerline of the precision bore. The method comprises of traversing the machine to the unqualified surface at a radial offset half of the precision bore. The method comprises of sweeping the indicator against the unqualified surface. The method comprises of reading the indicator dial from set position. The method of measuring a surface where traversing the indicator over a precision bore includes transferring a measurement. The method of measuring a surface comprises of positioning an indicator to a set position then measuring the surface from the set indicator reading.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

While a preferred embodiment of the inspection setup block has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as plastic, polymer, metal, composite, may be used. Although providing an inspection setup block has been described, it should be appreciated that the inspection setup block herein described is also suitable for the optical, astronomical, metrological, and other industries that utilize precision positioned pieces.

I claim:

1. A method of valuing a machine tool, said method comprising:
   defining a plane within a machine tool;
   defining an orientation within the machine tool;
   defining an origin within the machine tool;
   providing the prequalified test piece with a surface normal;
   probing a prequalified test piece placed upon the machine tool;
   recording the results of said probing;
   recording the deviation of the results of said probing from a set of target dimensions;
   comparing the deviation results to known standards; and
   identifying the largest deviation result of the machine tool.

2. The method of valuing a machine tool of claim 1 further comprising:
   said defining a plane including probing a surface with a minimum of three points of measurement.

3. The method of valuing a machine tool in claim 1 further comprising:
   said defining an orientation including probing a minimum of two points of measurement.

4. The method of valuing a machine tool in claim 1 further comprising:
   said defining an origin including probing a datum point.

5. The method of valuing a machine tool in claim 1 further comprising: said probing of prequalified test piece occurring ninety-degrees of surface normal of the test piece.

6. The method of valuing a machine tool in claim 1 further comprising:
   said recording probing results includes squareness, parallelism, positioning, and circularity.

7. A method of valuing a machine tool, said method comprising:
   defining a plane within a machine tool;
   defining an orientation within a machine tool;
   defining an origin within a machine tool;
   cutting a test piece;
   measuring the cutting results;
   recording the cutting results;
   recording the deviation of the cutting results from a set of target dimensions;
   comparing the deviation results to known standards; and
   identifying the largest deviation result of the machine tool.

8. The method of valuing a machine tool in claim 7 further comprising:
   said defining an orientation including two points of measurement.

9. The method of valuing a machine tool in claim 7 further comprising:
   said defining an origin including a datum point.

10. The method of valuing a machine tool in claim 7 further comprising:
    said recording cutting results including squareness, parallelism, positioning, and circularity.

11. The method of valuing a machine tool in claim 7 further comprising:
    profiling a cutting tool at a radial offset distance from a target feature, said profiling a cutting tool occurs after defining part setup.

12. A method of measuring an unqualified surface within a machine tool, said method comprising:
    providing a preferred indicator setup block;
    mounting an indicator in a machine tool spindle;
    locating the centerline of the setup block;
    loading said indicator to an unqualified surface of the precision bore;
    setting indicator on a dial to "set" position;
    rotating the spindle to confirm a centerline of the precision bore;
    traversing the machine to the unqualified surface at a radial offset half of the precision bore;
    sweeping the indicator against the unqualified surface; and
    reading the indicator dial from set position.

13. The method of measuring a surface in claim 12 wherein said traversing the indicator over a precision bore includes transferring a measurement.

14. The method of measuring a surface in claim 12 further comprising:
    positioning an indicator to a "set"; and, measuring the unqualified surface from the "set" indicator reading.

* * * * *